US009948329B2

(12) United States Patent
Saban et al.

(10) Patent No.: US 9,948,329 B2
(45) Date of Patent: *Apr. 17, 2018

(54) RADIO-FREQUENCY INTEGRATED CIRCUIT (RFIC) CHIP(S) FOR PROVIDING DISTRIBUTED ANTENNA SYSTEM FUNCTIONALITIES, AND RELATED COMPONENTS, SYSTEMS, AND METHODS

(71) Applicant: Corning Optical Communications Wireless Ltd, Airport (IL)

(72) Inventors: Ofer Saban, Vienna, VA (US); Isaac Shapira, Petach Tikva (IL)

(73) Assignee: Corning Optical Communications Wireless, Ltd, Airport (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,952

(22) Filed: Oct. 3, 2016

(65) Prior Publication Data
US 2017/0026062 A1    Jan. 26, 2017

Related U.S. Application Data

(63) Continuation of application No. 15/137,389, filed on Apr. 25, 2016, now Pat. No. 9,485,803, which is a
(Continued)

(51) Int. Cl.
*H04M 1/00*    (2006.01)
*H04B 7/00*    (2006.01)
(Continued)

(52) U.S. Cl.
CPC ......... *H04B 1/0075* (2013.01); *H04B 7/0413* (2013.01); *H04W 88/085* (2013.01); *H04L 2012/6459* (2013.01); *Y02B 60/50* (2013.01)

(58) Field of Classification Search
CPC .................................................... H04B 1/0075
(Continued)

(56) References Cited

U.S. PATENT DOCUMENTS 2,092,709 A    9/1937  Wheeler
2,298,435 A    10/1942 Tunick
(Continued)

FOREIGN PATENT DOCUMENTS

CA    2757542 C    7/1997
CA    2704030 C    10/2002
(Continued)

OTHER PUBLICATIONS

Author Unknown, "2441.8 MHz SAW Filter," Preliminary Data Sheet, Part No. 855916, Revision C, Sawtek (A TriQuint company), Oct. 13, 2005, Orlando, Florida, USA, pp. 1-5.
(Continued)

*Primary Examiner* — Tilahun B Gesesse
(74) *Attorney, Agent, or Firm* — C. Keith Montgomery

(57) ABSTRACT

Radio-frequency (RF) integrated circuit (RFIC) chip(s) allow for the integration of multiple electronic circuits on a chip to provide distributed antenna system functionalities. RFIC chips are employed in central unit and remote unit components, reducing component cost and size, increasing performance and reliability, while reducing power consumption. The components are also easier to manufacture. The RFIC chip(s) can be employed in distributed antenna systems and components that support RF communications services and/or digital data services.

15 Claims, 18 Drawing Sheets

Related U.S. Application Data continuation of application No. 14/486,387, filed on Sep. 15, 2014, which is a continuation of application No. PCT/US2013/033253, filed on Mar. 21, 2013, now Pat. No. 9,338,823.

(60) Provisional application No. 61/614,831, filed on Mar. 23, 2012.

(51) Int. Cl.
*H04B 1/00* (2006.01)
*H04W 88/08* (2009.01)
*H04B 7/0413* (2017.01)
*H04L 12/64* (2006.01)

(58) Field of Classification Search
USPC .............................. 455/553.1, 552.1, 550.1
See application file for complete search history.

(56) References Cited

U.S. PATENT DOCUMENTS

| | | |
|---|---|---|
| 2,411,786 A | 11/1946 | Halstead |
| 2,568,342 A | 9/1951 | Koehler et al. |
| 2,613,285 A | 10/1952 | Fromm |
| 2,671,850 A | 3/1954 | Marcou |
| 2,747,083 A | 5/1956 | Guanella |
| 2,964,623 A | 12/1960 | Bell |
| 2,986,723 A | 5/1961 | Darwin et al. |
| 3,072,899 A | 1/1963 | Kleist et al. |
| 3,274,339 A | 9/1966 | Herry et al. |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Haselwood et al. |
| 3,656,112 A | 4/1972 | Paull |
| 3,699,250 A | 10/1972 | Bunting |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,937,889 A | 2/1976 | Bell, III et al. |
| 3,992,589 A | 11/1976 | Kuegler |
| 4,008,369 A | 2/1977 | Theurer et al. |
| 4,013,840 A | 3/1977 | Anderson |
| 4,035,838 A | 7/1977 | Bassani et al. |
| 4,049,914 A | 9/1977 | Anderson et al. |
| 4,054,910 A | 10/1977 | Chou et al. |
| 4,063,173 A | 12/1977 | Nelson et al. |
| 4,171,467 A | 10/1979 | Evenchik |
| 4,186,347 A | 1/1980 | Brockman et al. |
| 4,199,761 A | 4/1980 | Whyte et al. |
| 4,200,862 A | 4/1980 | Campbell et al. |
| 4,205,270 A | 5/1980 | Okatani et al. |
| 4,206,320 A | 6/1980 | Keasler et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,417,279 A | 11/1983 | Shinkawa et al. |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,449,246 A | 5/1984 | Seiler et al. |
| 4,456,925 A | 6/1984 | Skerlos et al. |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,467,140 A | 8/1984 | Fathauer et al. |
| 4,468,538 A | 8/1984 | Cripps |
| 4,476,574 A | 10/1984 | Struven |
| 4,485,400 A | 11/1984 | Lemelson et al. |
| 4,493,948 A | 1/1985 | Sues et al. |
| 4,500,751 A | 2/1985 | Darland et al. |
| 4,500,976 A | 2/1985 | DuBroff |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,528,519 A | 7/1985 | van Driest |
| 4,546,212 A | 10/1985 | Crowder, Sr. |
| 4,556,988 A | 12/1985 | Yoshisato |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,706,274 A | 11/1987 | Baker et al. |
| 4,709,412 A | 11/1987 | Seymour et al. |
| 4,718,108 A | 1/1988 | Davidson et al. |
| 4,731,821 A | 3/1988 | Jackson, III |
| 4,746,809 A | 5/1988 | Coleman et al. |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,777,652 A | 10/1988 | Stolarczyk |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,850,009 A | 7/1989 | Zook et al. |
| 4,856,085 A | 8/1989 | Horvat |
| 4,864,588 A | 9/1989 | Simpson et al. |
| 4,866,733 A | 9/1989 | Morishita |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |

(56) References Cited

U.S. PATENT DOCUMENTS

| | | |
|---|---|---|
| 4,901,368 A | 2/1990 | Arnold et al. |
| 4,916,460 A | 4/1990 | Powell |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,941,200 A | 7/1990 | Leslie et al. |
| 4,941,207 A | 7/1990 | Maeda et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,959,862 A | 9/1990 | Davidov et al. |
| 4,969,136 A | 11/1990 | Chamberlin et al. |
| 4,972,505 A | 11/1990 | Isberg |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,980,665 A | 12/1990 | Schotz |
| 4,985,892 A | 1/1991 | Camarata |
| 4,989,081 A | 1/1991 | Miyagawa et al. |
| 4,996,709 A | 2/1991 | Heep et al. |
| 4,999,613 A | 3/1991 | Williamson et al. |
| 5,010,399 A | 4/1991 | Goodman et al. |
| 5,036,513 A | 7/1991 | Greenblatt |
| 5,045,948 A | 9/1991 | Streck et al. |
| 5,046,135 A | 9/1991 | Hatcher |
| 5,051,822 A | 9/1991 | Rhoades |
| 5,068,890 A | 11/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,109,222 A | 4/1992 | Welty et al. |
| 5,109,532 A | 4/1992 | Petrovic et al. |
| 5,115,463 A | 5/1992 | Moldavsky et al. |
| 5,142,397 A | 8/1992 | Dockery |
| 5,161,021 A | 11/1992 | Tsai |
| 5,187,803 A | 2/1993 | Sohner et al. |
| 5,187,806 A | 2/1993 | Johnson et al. |
| 5,206,655 A | 4/1993 | Caille et al. |
| 5,210,788 A | 5/1993 | Nilssen |
| 5,230,086 A | 7/1993 | Saul |
| 5,247,347 A | 9/1993 | Litteral et al. |
| 5,251,053 A | 10/1993 | Heidemann |
| 5,255,268 A | 10/1993 | Cato et al. |
| 5,257,006 A | 10/1993 | Graham et al. |
| 5,265,150 A | 11/1993 | Helmkamp et al. |
| 5,283,637 A | 2/1994 | Goolcharan |
| 5,297,203 A | 3/1994 | Rose et al. |
| 5,321,736 A | 6/1994 | Beasley |
| 5,321,846 A | 6/1994 | Yokota et al. |
| 5,339,184 A | 8/1994 | Tang |
| 5,353,334 A | 10/1994 | O'Sullivan |
| 5,361,407 A | 11/1994 | Sawada et al. |
| 5,363,432 A | 11/1994 | Martin et al. |
| 5,379,005 A | 1/1995 | Aden et al. |
| 5,404,570 A | 4/1995 | Charas et al. |
| 5,408,260 A | 4/1995 | Arnon |
| 5,410,343 A | 4/1995 | Coddington et al. |
| 5,428,836 A | 6/1995 | Sanecki et al. |
| 5,432,838 A | 7/1995 | Purchase et al. |
| 5,452,289 A | 9/1995 | Sharma et al. |
| 5,457,557 A | 10/1995 | Larem et al. |
| 5,463,616 A | 10/1995 | Kruse et al. |
| 5,469,495 A | 11/1995 | Beveridge |
| 5,481,249 A | 1/1996 | Sato |
| 5,487,069 A | 1/1996 | O'Sullivan et al. |
| 5,489,894 A | 2/1996 | Murray |
| 5,502,446 A | 3/1996 | Denninger |
| 5,537,637 A | 7/1996 | Sugita et al. |
| 5,539,821 A | 7/1996 | Blonder |
| 5,548,592 A | 8/1996 | Komarek et al. |
| 5,550,836 A | 8/1996 | Albrecht et al. |
| 5,550,898 A | 8/1996 | Abbasi et al. |
| 5,551,057 A | 8/1996 | Mitra |
| 5,553,063 A | 9/1996 | Dickson |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,587,692 A | 12/1996 | Graham et al. |
| 5,600,333 A | 2/1997 | Justice et al. |
| 5,603,080 A | 2/1997 | Kallander et al. |
| 5,610,916 A | 3/1997 | Kostreski et al. |
| 5,619,251 A | 4/1997 | Kuroiwa et al. |
| 5,619,505 A | 4/1997 | Grube et al. |
| 5,621,455 A | 4/1997 | Rogers et al. |
| 5,625,863 A | 4/1997 | Abraham |
| 5,627,879 A | 5/1997 | Russell et al. |
| 5,628,055 A | 5/1997 | Stein |
| 5,634,191 A | 5/1997 | Beasley |
| 5,642,405 A | 6/1997 | Fischer et al. |
| 5,644,622 A | 7/1997 | Russell et al. |
| 5,646,983 A | 7/1997 | Suffern et al. |
| 5,657,358 A | 8/1997 | Panech et al. |
| 5,657,374 A | 8/1997 | Russell et al. |
| 5,675,375 A | 10/1997 | Riffee |
| 5,694,232 A | 12/1997 | Parsay et al. |
| 5,696,790 A | 12/1997 | Graham et al. |
| 5,696,861 A | 12/1997 | Schimmeyer et al. |
| 5,708,705 A | 1/1998 | Yamashita et al. |
| 5,708,961 A | 1/1998 | Hylton et al. |
| 5,722,076 A | 2/1998 | Sakabe et al. |
| 5,726,984 A | 3/1998 | Kubler et al. |
| 5,734,678 A | 3/1998 | Paneth et al. |
| 5,736,965 A | 4/1998 | Mosebrook et al. |
| 5,748,104 A | 5/1998 | Argyroudis et al. |
| 5,757,803 A | 5/1998 | Russell et al. |
| 5,758,294 A | 5/1998 | Ganesan et al. |
| 5,765,099 A | 6/1998 | Georges et al. |
| 5,774,789 A | 6/1998 | van der Kaay et al. |
| 5,778,303 A | 7/1998 | Shinozaki et al. |
| 5,787,115 A | 7/1998 | Turnbull et al. |
| 5,790,536 A | 8/1998 | Mahany et al. |
| 5,802,283 A | 9/1998 | Grady et al. |
| 5,802,463 A | 9/1998 | Zuckerman |
| 5,809,395 A | 9/1998 | Hamilton-Piercy et al. |
| 5,809,422 A | 9/1998 | Raleigh et al. |
| 5,812,184 A | 9/1998 | Martinez |
| 5,812,786 A | 9/1998 | Seazholtz et al. |
| 5,815,086 A | 9/1998 | Ivie et al. |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,841,360 A | 11/1998 | Binder |
| 5,841,840 A | 11/1998 | Smith et al. |
| 5,841,841 A | 11/1998 | Dodds et al. |
| 5,848,054 A | 12/1998 | Mosebrook et al. |
| 5,848,150 A | 12/1998 | Bingel |
| 5,864,284 A | 1/1999 | Sanderson |
| 5,878,047 A | 3/1999 | Ganek et al. |
| 5,896,443 A | 4/1999 | Dichter |
| 5,896,569 A | 4/1999 | Butler et al. |
| 5,901,340 A | 5/1999 | Flickinger et al. |
| 5,903,834 A | 5/1999 | Wallstedt et al. |
| 5,905,442 A | 5/1999 | Mosebrook et al. |
| 5,910,776 A | 6/1999 | Black |
| 5,912,895 A | 6/1999 | Terry et al. |
| 5,926,531 A | 7/1999 | Petite |
| 5,929,896 A | 7/1999 | Goodman et al. |
| 5,930,340 A | 7/1999 | Bell |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,949,476 A | 9/1999 | Pocock et al. |

(56) References Cited

U.S. PATENT DOCUMENTS

| | | |
|---|---|---|
| 5,950,149 A | 9/1999 | Fieramosca et al. |
| 5,953,670 A | 9/1999 | Newson |
| 5,960,066 A | 9/1999 | Hartmann et al. |
| 5,963,539 A | 10/1999 | Webber, Jr. et al. |
| 5,963,595 A | 10/1999 | Graham et al. |
| 5,977,913 A | 11/1999 | Christ |
| 5,982,363 A | 11/1999 | Naiff |
| 5,982,784 A | 11/1999 | Bell |
| 5,982,854 A | 11/1999 | Ehreth |
| 5,983,070 A | 11/1999 | Georges et al. |
| 5,986,574 A | 11/1999 | Colton |
| 5,987,303 A | 11/1999 | Dutta et al. |
| 5,994,998 A | 11/1999 | Fisher et al. |
| 5,995,593 A | 11/1999 | Cho |
| 5,995,598 A | 11/1999 | Berstis |
| 6,002,722 A | 12/1999 | Wu |
| 6,005,873 A | 12/1999 | Amit |
| 6,005,884 A | 12/1999 | Cook et al. |
| 6,014,546 A | 1/2000 | Georges et al. |
| 6,026,150 A | 2/2000 | Frank et al. |
| 6,032,057 A | 2/2000 | Kiiski |
| 6,038,425 A | 3/2000 | Jeffrey |
| 6,040,759 A | 3/2000 | Sanderson |
| 6,049,705 A | 4/2000 | Xue |
| 6,052,380 A | 4/2000 | Bell |
| 6,061,357 A | 5/2000 | Olshansky et al. |
| 6,061,392 A | 5/2000 | Bremer et al. |
| 6,069,588 A | 5/2000 | O'Neill, Jr. |
| 6,069,899 A | 5/2000 | Foley |
| 6,087,860 A | 7/2000 | Liu et al. |
| 6,088,368 A | 7/2000 | Rubinstain et al. |
| 6,094,441 A | 7/2000 | Jung et al. |
| 6,101,341 A | 8/2000 | Manabe |
| 6,108,331 A | 8/2000 | Thompson |
| 6,112,086 A | 8/2000 | Wala |
| 6,115,755 A | 9/2000 | Krishan |
| 6,128,470 A | 10/2000 | Naidu et al. |
| 6,130,893 A | 10/2000 | Whittaker et al. |
| 6,130,896 A | 10/2000 | Lueker et al. |
| 6,137,865 A | 10/2000 | Ripy et al. |
| 6,141,356 A | 10/2000 | Gorman |
| 6,151,480 A | 11/2000 | Fischer et al. |
| 6,157,810 A | 12/2000 | Georges et al. |
| 6,175,860 B1 | 1/2001 | Gaucher |
| 6,192,399 B1 | 2/2001 | Goodman |
| 6,198,432 B1 | 3/2001 | Janky |
| 6,202,211 B1 | 3/2001 | Williams, Jr. |
| 6,212,227 B1 | 4/2001 | Ko et al. |
| 6,215,789 B1 | 4/2001 | Keenan et al. |
| 6,216,160 B1 | 4/2001 | Dichter |
| 6,218,931 B1 | 4/2001 | Asghar et al. |
| 6,222,503 B1 | 4/2001 | Gietema et al. |
| 6,240,166 B1 | 5/2001 | Collin et al. |
| 6,243,413 B1 | 6/2001 | Beukema |
| 6,243,571 B1 | 6/2001 | Bullock et al. |
| 6,249,671 B1 | 6/2001 | Tucker et al. |
| 6,256,296 B1 | 7/2001 | Ruziak et al. |
| 6,292,467 B1 | 9/2001 | Keller |
| 6,292,517 B1 | 9/2001 | Jeffress et al. |
| 6,307,868 B1 | 10/2001 | Rakib et al. |
| 6,310,894 B1 | 10/2001 | Counterman |
| 6,317,599 B1 | 11/2001 | Rappaport et al. |
| 6,317,884 B1 | 11/2001 | Eames et al. |
| 6,320,900 B1 | 11/2001 | Liu |
| 6,324,268 B1 | 11/2001 | Balachandran et al. |
| 6,330,244 B1 | 12/2001 | Swartz et al. |
| 6,334,219 B1 | 12/2001 | Hill et al. |
| 6,346,875 B1 | 2/2002 | Puckette et al. |
| 6,349,133 B1 | 2/2002 | Matthews et al. |
| 6,353,599 B1 | 3/2002 | Bi et al. |
| 6,370,149 B1 | 4/2002 | Gorman et al. |
| 6,389,010 B1 | 5/2002 | Kubler et al. |
| 6,389,125 B1 | 5/2002 | Ubowski |
| 6,392,349 B1 | 5/2002 | Crenshaw |
| 6,392,397 B1 | 5/2002 | Thomas |
| 6,393,050 B1 | 5/2002 | Liu |
| 6,397,288 B1 | 5/2002 | Rye et al. |
| 6,400,815 B1 | 6/2002 | Gilboy et al. |
| 6,400,957 B1 | 6/2002 | Rodrigues et al. |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,434,123 B1 | 8/2002 | Park |
| 6,438,109 B1 | 8/2002 | Karaoguz et al. |
| 6,449,318 B1 | 9/2002 | Rumbaugh |
| 6,452,910 B1 | 9/2002 | Vij et al. |
| 6,452,915 B1 | 9/2002 | Jorgensen |
| 6,452,923 B1 | 9/2002 | Gerszberg et al. |
| 6,470,053 B1 | 10/2002 | Liu |
| 6,473,495 B1 | 10/2002 | Willer |
| 6,473,609 B1 | 10/2002 | Schwartz et al. |
| 6,480,510 B1 | 11/2002 | Binder |
| 6,483,470 B1 | 11/2002 | Hohnstein et al. |
| 6,483,902 B1 | 11/2002 | Stewart et al. |
| 6,490,314 B1 | 12/2002 | Khayrallah et al. |
| 6,492,897 B1 | 12/2002 | Mowery, Jr. |
| 6,493,875 B1 | 12/2002 | Eames et al. |
| 6,501,942 B1 | 12/2002 | Weissman et al. |
| 6,513,163 B1 | 1/2003 | Silvia et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,587 B1 | 3/2003 | Kobayashi |
| 6,539,011 B1 | 3/2003 | Keenan et al. |
| 6,539,216 B1 | 3/2003 | Oh et al. |
| 6,546,098 B1 | 4/2003 | Henderson |
| 6,549,616 B1 | 4/2003 | Binder |
| 6,556,581 B1 | 4/2003 | He et al. |
| 6,560,319 B1 | 5/2003 | Binder |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,570,913 B1 | 5/2003 | Chen |
| 6,572,384 B1 | 6/2003 | Marchevsky |
| 6,573,826 B2 | 6/2003 | Pan |
| 6,574,242 B1 | 6/2003 | Keenan et al. |
| 6,577,231 B2 | 6/2003 | Litwin, Jr. et al. |
| 6,577,631 B1 | 6/2003 | Keenan et al. |
| 6,580,402 B2 | 6/2003 | Navarro et al. |
| 6,580,710 B1 | 6/2003 | Bowen et al. |
| 6,580,728 B1 | 6/2003 | Cook et al. |
| 6,580,785 B2 | 6/2003 | Bremer et al. |
| 6,583,719 B2 | 6/2003 | Okada et al. |
| 6,587,473 B2 | 7/2003 | Terry et al. |
| 6,587,479 B1 | 7/2003 | Bianchi et al. |
| 6,587,739 B1 | 7/2003 | Abrams et al. |
| 6,603,808 B1 | 8/2003 | Anne et al. |
| 6,615,074 B2 | 9/2003 | Mickle et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Beamish et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,668,328 B1 | 12/2003 | Bell |
| 6,670,930 B2 | 12/2003 | Navarro |
| 6,678,321 B1 | 1/2004 | Graham et al. |
| 6,678,721 B1 | 1/2004 | Bell |
| 6,683,531 B2 | 1/2004 | Diamanti et al. |
| 6,690,677 B1 | 2/2004 | Binder |
| 6,693,916 B1 | 2/2004 | Chaplik et al. |
| 6,697,358 B2 | 2/2004 | Bernstein |
| 6,697,603 B1 | 2/2004 | Lovinggood et al. |
| 6,701,137 B1 | 3/2004 | Judd et al. |
| 6,701,406 B1 | 3/2004 | Chang et al. |
| 6,704,545 B1 | 3/2004 | Wala |

(56) References Cited

U.S. PATENT DOCUMENTS

| | | |
|---|---|---|
| 6,710,721 B1 | 3/2004 | Holowick |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,725,059 B1 | 4/2004 | Bell |
| 6,731,945 B2 | 5/2004 | Do et al. |
| 6,732,315 B2 | 5/2004 | Yagil et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,597 B1 | 5/2004 | Jeung et al. |
| 6,738,641 B1 | 5/2004 | Elsasser |
| 6,748,080 B2 | 6/2004 | Russ et al. |
| 6,751,441 B1 | 6/2004 | Murray et al. |
| 6,754,186 B1 | 6/2004 | Bullman |
| 6,759,946 B2 | 7/2004 | Sahinoglu et al. |
| 6,760,601 B1 | 7/2004 | Suoknuuti et al. |
| 6,763,097 B1 | 7/2004 | Vitenberg |
| 6,763,226 B1 | 7/2004 | McZeal, Jr. |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B2 | 8/2004 | Bell |
| 6,785,558 B1 | 8/2004 | Stratford et al. |
| 6,792,251 B2 | 9/2004 | Johannisson et al. |
| 6,801,767 B1 | 10/2004 | Schwartz et al. |
| 6,807,463 B1 | 10/2004 | Cunningham et al. |
| 6,819,706 B1 | 11/2004 | Lim |
| 6,819,760 B1 | 11/2004 | Nayler |
| 6,822,946 B1 | 11/2004 | Wallace |
| 6,826,163 B2 | 11/2004 | Mani et al. |
| 6,826,164 B2 | 11/2004 | Mani et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,836,546 B1 | 12/2004 | Willer |
| 6,839,345 B2 | 1/2005 | Lu et al. |
| 6,842,433 B2 | 1/2005 | West et al. |
| 6,842,459 B1 | 1/2005 | Binder |
| 6,844,809 B2 | 1/2005 | Manis et al. |
| 6,850,510 B2 | 2/2005 | Kubler et al. |
| 6,857,132 B1 | 2/2005 | Rakib et al. |
| 6,862,349 B1 | 3/2005 | Beveridge |
| 6,862,353 B2 | 3/2005 | Rabenko et al. |
| 6,865,193 B2 | 3/2005 | Terk |
| 6,868,072 B1 | 3/2005 | Lin et al. |
| 6,876,056 B2 | 4/2005 | Tilmans et al. |
| 6,880,103 B2 | 4/2005 | Kim et al. |
| 6,885,674 B2 | 4/2005 | Hunt et al. |
| 6,895,249 B2 | 5/2005 | Gaal |
| 6,901,439 B1 | 5/2005 | Bonasia et al. |
| 6,904,134 B2 | 6/2005 | Jeon et al. |
| 6,909,725 B1 | 6/2005 | Chow |
| 6,914,539 B2 | 7/2005 | Hoctor et al. |
| 6,919,858 B2 | 7/2005 | Rofougaran |
| 6,922,407 B2 | 7/2005 | Wu |
| 6,925,089 B2 | 8/2005 | Chow et al. |
| 6,931,659 B1 | 8/2005 | Kinemura |
| 6,933,835 B2 | 8/2005 | Kline |
| 6,934,754 B2 | 8/2005 | West et al. |
| 6,937,056 B2 | 8/2005 | Binder |
| 6,941,364 B2 | 9/2005 | Kim et al. |
| 6,941,576 B2 | 9/2005 | Amit |
| 6,947,408 B1 | 9/2005 | Liberti et al. |
| 6,947,736 B2 | 9/2005 | Shaver et al. |
| 6,950,567 B2 | 9/2005 | Kline |
| 6,961,303 B1 | 11/2005 | Binder |
| 6,961,312 B2 | 11/2005 | Kubler et al. |
| 6,961,763 B1 | 11/2005 | Wang et al. |
| 6,963,552 B2 | 11/2005 | Sabat, Jr. et al. |
| 6,963,559 B2 | 11/2005 | Elo |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,987,988 B2 | 1/2006 | Uchiyama |
| 6,989,733 B2 | 1/2006 | Simonsen et al. |
| 6,993,317 B2 | 1/2006 | Belsak, Jr. |
| 6,995,657 B2 | 2/2006 | Zalitzky et al. |
| 6,996,213 B1 | 2/2006 | De Jong |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,015,826 B1 | 3/2006 | Chan et al. |
| 7,016,377 B1 | 3/2006 | Chun et al. |
| 7,023,382 B1 | 4/2006 | Akano |
| 7,024,166 B2 | 4/2006 | Wallace et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,035,671 B2 | 4/2006 | Solum |
| 7,039,399 B2 | 5/2006 | Fischer |
| 7,046,716 B1 | 5/2006 | Miao |
| 7,050,017 B2 | 5/2006 | King et al. |
| 7,053,838 B2 | 5/2006 | Judd |
| 7,054,303 B2 | 5/2006 | Miyazaki et al. |
| 7,064,654 B2 | 6/2006 | Berkman et al. |
| 7,079,597 B1 | 7/2006 | Shiraishi et al. |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,099,621 B1 | 8/2006 | Chadwick |
| 7,103,240 B2 | 9/2006 | Kline |
| 7,103,377 B2 | 9/2006 | Bauman et al. |
| 7,106,721 B1 | 9/2006 | Binder |
| 7,113,134 B1 | 9/2006 | Berkman |
| 7,113,574 B1 | 9/2006 | Haas et al. |
| 7,113,763 B2 | 9/2006 | Heinonen et al. |
| 7,117,520 B2 | 10/2006 | Stewart |
| 7,123,939 B1 | 10/2006 | Bird et al. |
| 7,127,175 B2 | 10/2006 | Mani et al. |
| 7,133,729 B1 | 11/2006 | Wang et al. |
| 7,142,535 B2 | 11/2006 | Kubler et al. |
| 7,142,560 B2 | 11/2006 | Mansfield |
| 7,142,563 B1 | 11/2006 | Lin |
| 7,149,474 B1 | 12/2006 | Mikhak |
| 7,151,575 B1 | 12/2006 | Landry et al. |
| 7,154,996 B2 | 12/2006 | Strauss |
| 7,155,214 B2 | 12/2006 | Struthers et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,171,244 B2 | 1/2007 | Bauman |
| 7,181,023 B1 | 2/2007 | Andrews et al. |
| 7,194,251 B2 | 3/2007 | Rubinstein et al. |
| 7,199,443 B2 | 4/2007 | Elsharawy |
| 7,209,719 B2 | 4/2007 | Liebenow |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,263,293 B2 | 8/2007 | Ommodt et al. |
| 7,266,344 B2 | 9/2007 | Rodriguez |
| 7,269,311 B2 | 9/2007 | Kim et al. |
| 7,292,859 B2 | 11/2007 | Park |
| 7,299,287 B1 | 11/2007 | Rubinstein et al. |
| 7,315,735 B2 | 1/2008 | Graham |
| 7,317,793 B2 | 1/2008 | Binder et al. |
| 7,321,316 B2 | 1/2008 | Hancock et al. |
| 7,359,449 B2 | 4/2008 | Feher |

(56) References Cited

U.S. PATENT DOCUMENTS

| | | |
|---|---|---|
| 7,359,674 B2 | 4/2008 | Markki et al. |
| 7,366,151 B2 | 4/2008 | Kubler et al. |
| 7,369,526 B2 | 5/2008 | Lechleider et al. |
| 7,408,898 B1 | 8/2008 | Brown |
| 7,412,224 B2 | 8/2008 | Kotola et al. |
| 7,442,679 B2 | 10/2008 | Stolte et al. |
| 7,451,365 B2 | 11/2008 | Wang et al. |
| 7,460,507 B2 | 12/2008 | Kubler et al. |
| 7,469,105 B2 | 12/2008 | Wake et al. |
| 7,508,785 B2 | 3/2009 | Dale et al. |
| 7,525,972 B2 | 4/2009 | Townsley et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,599,420 B2 | 10/2009 | Forenza et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,854 B2 | 8/2010 | Conyers et al. |
| 7,796,197 B2 | 9/2010 | Busson et al. |
| 7,805,073 B2 | 9/2010 | Sabat, Jr. et al. |
| 7,809,012 B2 | 10/2010 | Ruuska et al. |
| 7,813,451 B2 | 10/2010 | Binder et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,308 B2 | 10/2011 | Rofougaran |
| 8,060,126 B2 | 11/2011 | Han et al. |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,174,428 B2 | 5/2012 | Wegener |
| 8,175,649 B2 | 5/2012 | Saban et al. |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,306,563 B2 | 11/2012 | Zavadsky et al. |
| 8,320,957 B2 | 11/2012 | Saban et al. |
| 8,326,313 B2 | 12/2012 | McHenry et al. |
| 8,346,091 B2 | 1/2013 | Kummetz et al. |
| 8,346,278 B2 | 1/2013 | Wala et al. |
| 8,380,144 B1 | 2/2013 | Bai et al. |
| 8,396,368 B2 | 3/2013 | Tarlazzi et al. |
| 8,422,884 B2 | 4/2013 | Mao |
| 8,428,510 B2 | 4/2013 | Stratford et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,532,242 B2 | 9/2013 | Fischer et al. |
| 8,548,526 B2 | 10/2013 | Schmidt et al. |
| 8,583,100 B2 | 11/2013 | Koziy et al. |
| 8,594,133 B2 | 11/2013 | Shapira et al. |
| 8,634,766 B2 | 1/2014 | Hobbs et al. |
| 8,675,711 B1 | 3/2014 | McDermott et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,724,664 B2 | 5/2014 | Stapleton et al. |
| 8,737,300 B2 | 5/2014 | Stapleton et al. |
| 8,743,756 B2 | 6/2014 | Uyehara et al. |
| 8,787,975 B2 | 7/2014 | Kanojia et al. |
| 8,792,833 B2 | 7/2014 | Tobia et al. |
| 8,792,933 B2 | 7/2014 | Chen |
| 8,867,451 B2 | 10/2014 | Kummetz et al. |
| 8,908,607 B2 | 12/2014 | Kummetz et al. |
| 8,948,816 B2 | 2/2015 | Fischer et al. |
| 8,958,789 B2 | 2/2015 | Bauman et al. |
| 8,976,067 B2 | 3/2015 | Fisdcher |
| 9,001,811 B2 | 4/2015 | Wala et al. |
| 9,031,597 B2 | 5/2015 | Zhang et al. |
| 9,100,834 B2 | 8/2015 | Guey et al. |
| 9,112,547 B2* | 8/2015 | Scheinert ............... H04B 7/022 |
| 9,112,611 B2* | 8/2015 | Palanisamy ...... H04B 10/25754 |
| 9,137,771 B2 | 9/2015 | Wrappe |
| 9,160,449 B2 | 10/2015 | Heidler et al. |
| 9,184,960 B1 | 11/2015 | Harel |
| 9,240,835 B2* | 1/2016 | Berlin .................. H04B 7/2606 |
| 9,252,874 B2 | 2/2016 | Heidler et al. |
| 9,253,003 B1 | 2/2016 | Harel |
| 9,338,823 B2 | 5/2016 | Saban et al. |
| 9,485,803 B2 | 11/2016 | Saban et al. |
| 2001/0001616 A1 | 5/2001 | Rakib et al. |
| 2001/0033188 A1 | 10/2001 | Aung et al. |
| 2001/0040472 A1 | 11/2001 | Suga et al. |
| 2002/0003873 A1 | 1/2002 | Rabenko et al. |
| 2002/0006137 A1 | 1/2002 | Rabenko et al. |
| 2002/0011923 A1 | 1/2002 | Cunningham et al. |
| 2002/0019966 A1 | 2/2002 | Yagil et al. |
| 2002/0025778 A1 | 2/2002 | Lee |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0039388 A1 | 4/2002 | Smart et al. |
| 2002/0039885 A1 | 4/2002 | Weissman et al. |
| 2002/0049036 A1 | 4/2002 | Bullock et al. |
| 2002/0052188 A1 | 5/2002 | Behbahani |
| 2002/0060617 A1 | 5/2002 | Walbeck et al. |
| 2002/0061012 A1 | 5/2002 | Thi et al. |
| 2002/0061763 A1 | 5/2002 | Weissman |
| 2002/0075806 A1 | 6/2002 | Shalvi et al. |
| 2002/0103012 A1* | 8/2002 | Kim ..................... H01Q 1/007 455/562.1 |
| 2002/0114354 A1 | 8/2002 | Sinha et al. |

(56) References Cited

U.S. PATENT DOCUMENTS

| | | |
|---|---|---|
| 2002/0123365 A1 | 9/2002 | Thorson et al. |
| 2002/0128009 A1 | 9/2002 | Boch et al. |
| 2002/0128043 A1 | 9/2002 | Chandler |
| 2002/0144159 A1 | 10/2002 | Wu et al. |
| 2002/0146207 A1 | 10/2002 | Chu |
| 2002/0154620 A1 | 10/2002 | Azenkot et al. |
| 2002/0165989 A1 | 11/2002 | Etoh |
| 2002/0166124 A1 | 11/2002 | Gurantz et al. |
| 2002/0176567 A1 | 11/2002 | Chen et al. |
| 2002/0186836 A1 | 12/2002 | Leuca et al. |
| 2002/0194383 A1 | 12/2002 | Cohen et al. |
| 2002/0198952 A1 | 12/2002 | Bell |
| 2003/0006881 A1 | 1/2003 | Reyes |
| 2003/0016418 A1 | 1/2003 | Westbrook et al. |
| 2003/0016794 A1 | 1/2003 | Brothers |
| 2003/0018975 A1 | 1/2003 | Stone |
| 2003/0031191 A1 | 2/2003 | El Wardani et al. |
| 2003/0053484 A1 | 3/2003 | Sorenson et al. |
| 2003/0056221 A1 | 3/2003 | Zhang et al. |
| 2003/0062990 A1 | 4/2003 | Schaeffer, Jr. et al. |
| 2003/0067910 A1 | 4/2003 | Razazian et al. |
| 2003/0068033 A1 | 4/2003 | Kiko |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2003/0112965 A1 | 6/2003 | McNamara et al. |
| 2003/0139151 A1 | 7/2003 | Lifshitz et al. |
| 2003/0169752 A1 | 9/2003 | Chen et al. |
| 2003/0179868 A1 | 9/2003 | Binder |
| 2003/0186668 A1 | 10/2003 | Fitzrandolph |
| 2003/0224728 A1 | 12/2003 | Heinonen et al. |
| 2004/0017785 A1 | 1/2004 | Zelst |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0090984 A1 | 5/2004 | Saint-Hilaire et al. |
| 2004/0100930 A1 | 5/2004 | Shapira et al. |
| 2004/0102196 A1 | 5/2004 | Weckstrom et al. |
| 2004/0105435 A1 | 6/2004 | Morioka |
| 2004/0106435 A1 | 6/2004 | Bauman et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0131357 A1 | 7/2004 | Farmer et al. |
| 2004/0136388 A1 | 7/2004 | Schaff |
| 2004/0146020 A1 | 7/2004 | Kubler et al. |
| 2004/0151164 A1 | 8/2004 | Kubler et al. |
| 2004/0151305 A1 | 8/2004 | Binder et al. |
| 2004/0153879 A1 | 8/2004 | Fukutani et al. |
| 2004/0158649 A1 | 8/2004 | Ophir et al. |
| 2004/0160346 A1 | 8/2004 | Husted et al. |
| 2004/0160912 A1 | 8/2004 | Kubler et al. |
| 2004/0160913 A1 | 8/2004 | Kubler et al. |
| 2004/0162117 A1 | 8/2004 | Liebenow |
| 2004/0165573 A1 | 8/2004 | Kubler et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0201457 A1 | 10/2004 | O'Toole et al. |
| 2004/0203387 A1 | 10/2004 | Grannan |
| 2004/0203703 A1 | 10/2004 | Fischer |
| 2004/0204036 A1 | 10/2004 | Yang |
| 2004/0204040 A1 | 10/2004 | Heijnen |
| 2004/0208167 A1 | 10/2004 | Kishida |
| 2004/0208599 A1 | 10/2004 | Swartz et al. |
| 2004/0213351 A1 | 10/2004 | Shattil |
| 2004/0225740 A1 | 11/2004 | Klemba et al. |
| 2004/0235468 A1 | 11/2004 | Luebke et al. |
| 2004/0248531 A1 | 12/2004 | Takaki |
| 2004/0255332 A1 | 12/2004 | Bertonis et al. |
| 2004/0259538 A1 | 12/2004 | Agbegnenou |
| 2004/0264087 A1 | 12/2004 | Bishop |
| 2004/0268160 A1 | 12/2004 | Atkinson et al. |
| 2005/0010954 A1 | 1/2005 | Binder |
| 2005/0018648 A1 | 1/2005 | Scheelke |
| 2005/0018857 A1 | 1/2005 | McCarty et al. |
| 2005/0024945 A1 | 2/2005 | Forbes |
| 2005/0025099 A1 | 2/2005 | Heath, Jr. et al. |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0097369 A1 | 5/2005 | Bowser et al. |
| 2005/0114325 A1 | 5/2005 | Liu et al. |
| 2005/0117545 A1 | 6/2005 | Wittwer et al. |
| 2005/0136972 A1 | 6/2005 | Smith et al. |
| 2005/0144647 A1 | 6/2005 | Zussman et al. |
| 2005/0147067 A1 | 7/2005 | Mani et al. |
| 2005/0147071 A1 | 7/2005 | Karaoguz et al. |
| 2005/0152337 A1 | 7/2005 | Wurtzel et al. |
| 2005/0164666 A1 | 7/2005 | Lang et al. |
| 2005/0180561 A1 | 8/2005 | Hazani et al. |
| 2005/0181839 A1 | 8/2005 | Tiainen et al. |
| 2005/0184915 A1 | 8/2005 | Nagel et al. |
| 2005/0201323 A1 | 9/2005 | Mani et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0265428 A1 | 12/2005 | McCorkle |
| 2005/0265430 A1 | 12/2005 | Ozluturk et al. |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0018328 A1 | 1/2006 | Mody et al. |
| 2006/0045524 A1 | 3/2006 | Lee et al. |
| 2006/0045525 A1 | 3/2006 | Lee et al. |
| 2006/0048197 A1 | 3/2006 | Petruzzelli |
| 2006/0056283 A1 | 3/2006 | Anikhindi et al. |
| 2006/0066455 A1 | 3/2006 | Hancock et al. |
| 2006/0072684 A1 | 4/2006 | Feher |
| 2006/0098620 A1 | 5/2006 | Zhou et al. |
| 2006/0126617 A1 | 6/2006 | Cregg et al. |
| 2006/0128425 A1 | 6/2006 | Rooyen |
| 2006/0133465 A1 | 6/2006 | Dockemeyer, Jr. et al. |
| 2006/0152344 A1 | 7/2006 | Mowery, Jr. |
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0193336 A1 | 8/2006 | Landry et al. |
| 2006/0194575 A1 | 8/2006 | Stadelmeier et al. |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262014 A1 | 11/2006 | Shemesh et al. |
| 2006/0274704 A1 | 12/2006 | Desai et al. |
| 2006/0274745 A1 | 12/2006 | Wang et al. |
| 2006/0276227 A1 | 12/2006 | Dravida |
| 2006/0280197 A1 | 12/2006 | Stone |
| 2006/0286958 A1 | 12/2006 | Lee et al. |
| 2006/0291493 A1 | 12/2006 | Schley-May et al. |
| 2007/0002772 A1 | 1/2007 | Berkman et al. |
| 2007/0002876 A1 | 1/2007 | Berkman et al. |
| 2007/0008939 A1 | 1/2007 | Fischer |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |

(56) References Cited

U.S. PATENT DOCUMENTS

| | | |
|---|---|---|
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0211661 A1 | 9/2007 | Tee et al. |
| 2007/0224954 A1 | 9/2007 | Gopi |
| 2007/0245393 A1 | 10/2007 | Fernandez |
| 2007/0254714 A1 | 11/2007 | Martich et al. |
| 2007/0264009 A1 | 11/2007 | Sabat, Jr. et al. |
| 2007/0268846 A1 | 11/2007 | Proctor, Jr. et al. |
| 2007/0268886 A1 | 11/2007 | Caspi et al. |
| 2007/0292143 A1 | 12/2007 | Yu et al. |
| 2007/0297005 A1 | 12/2007 | Montierth et al. |
| 2008/0009260 A1 | 1/2008 | Chiu |
| 2008/0043714 A1 | 2/2008 | Pernu |
| 2008/0063397 A1 | 3/2008 | Hu et al. |
| 2008/0070586 A1 | 3/2008 | Kermoal et al. |
| 2008/0098203 A1 | 4/2008 | Master et al. |
| 2008/0107044 A1 | 5/2008 | Blair et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0144493 A1 | 6/2008 | Yeh |
| 2008/0144758 A1 | 6/2008 | Hunter et al. |
| 2008/0207253 A1 | 8/2008 | Jaakkola et al. |
| 2008/0232305 A1 | 9/2008 | Oren et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0291985 A1 | 11/2008 | Adnani et al. |
| 2008/0292322 A1 | 11/2008 | Daghighian et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0034457 A1 | 2/2009 | Bahl et al. |
| 2009/0047023 A1 | 2/2009 | Pescod et al. |
| 2009/0059903 A1 | 3/2009 | Kubler et al. |
| 2009/0060081 A1 | 3/2009 | Zhang et al. |
| 2009/0060531 A1 | 3/2009 | Biegert et al. |
| 2009/0061796 A1 | 3/2009 | Arkko et al. |
| 2009/0073916 A1 | 3/2009 | Zhang et al. |
| 2009/0147748 A1 | 6/2009 | Ofuji et al. |
| 2009/0149221 A1 | 6/2009 | Liu et al. |
| 2009/0163223 A1 | 6/2009 | Casey |
| 2009/0168796 A1 | 7/2009 | Pandey et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0232071 A1 | 9/2009 | Cho et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252139 A1 | 10/2009 | Ludovico et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0285158 A1 | 11/2009 | Rezaiifar et al. |
| 2009/0316608 A1 | 12/2009 | Singh et al. |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0027492 A1 | 2/2010 | Asanuma |
| 2010/0056200 A1 | 3/2010 | Tolonen |
| 2010/0074267 A1 | 3/2010 | Ladd |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0097952 A1 | 4/2010 | McHenry et al. |
| 2010/0104042 A1 | 4/2010 | Benjebbour et al. |
| 2010/0105332 A1 | 4/2010 | McHenry et al. |
| 2010/0118864 A1 | 5/2010 | Kubler et al. |
| 2010/0118894 A1 | 5/2010 | Aweya et al. |
| 2010/0127937 A1 | 5/2010 | Chandrasekaran et al. |
| 2010/0134257 A1 | 6/2010 | Puleston et al. |
| 2010/0142955 A1 | 6/2010 | Yu et al. |
| 2010/0148373 A1 | 6/2010 | Chandrasekaran |
| 2010/0148383 A1 | 6/2010 | DiGiovanni et al. |
| 2010/0156721 A1 | 6/2010 | Alamouti et al. |
| 2010/0172446 A1 | 7/2010 | Popoli |
| 2010/0173586 A1 | 7/2010 | McHenry et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0096875 A1 | 4/2011 | Amrutur et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0170424 A1 | 7/2011 | Safavi |
| 2011/0182230 A1 | 7/2011 | Ohm et al. |
| 2011/0194475 A1 | 8/2011 | Kim et al. |
| 2011/0201368 A1* | 8/2011 | Faccin ............... H04B 7/0413 455/507 |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222490 A1 | 9/2011 | Fischer et al. |
| 2011/0222619 A1 | 9/2011 | Ramamurthi et al. |
| 2011/0223951 A1 | 9/2011 | Miyoshi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |

(56) References Cited

U.S. PATENT DOCUMENTS

| | | |
|---|---|---|
| 2011/0281536 A1 | 11/2011 | Lee et al. |
| 2011/0317647 A1 | 12/2011 | Cho et al. |
| 2012/0134328 A1 | 5/2012 | Gauvreau et al. |
| 2012/0254458 A1 | 10/2012 | Langille |
| 2012/0286864 A1 | 11/2012 | Vella-Coleiro |
| 2012/0307941 A1 | 12/2012 | Watanabe |
| 2012/0314797 A1 | 12/2012 | Kummetz et al. |
| 2013/0017792 A1 | 1/2013 | Miller, II |
| 2013/0017863 A1 | 1/2013 | Kummetz et al. |
| 2013/0029704 A1 | 1/2013 | Koo et al. |
| 2013/0051404 A1 | 2/2013 | Binder et al. |
| 2013/0058281 A1 | 3/2013 | Berlin et al. |
| 2013/0107763 A1 | 5/2013 | Uyehara et al. |
| 2013/0235851 A1 | 9/2013 | Abu-Surra et al. |
| 2013/0244722 A1 | 9/2013 | Rousu et al. |
| 2013/0252664 A1 | 9/2013 | Haralabidis et al. |
| 2013/0279417 A1 | 10/2013 | Binder et al. |
| 2013/0315266 A1 | 11/2013 | Chen |
| 2013/0329407 A1 | 12/2013 | Rapisarda |
| 2013/0337789 A1 | 12/2013 | Johnson |
| 2014/0024402 A1 | 1/2014 | Singh |
| 2014/0073279 A1 | 3/2014 | Blair et al. |
| 2014/0077876 A1 | 3/2014 | Feygin et al. |
| 2014/0094165 A1 | 4/2014 | Karlsson et al. |
| 2014/0119281 A1 | 5/2014 | Kummetz et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0162570 A1 | 6/2014 | Lin et al. |
| 2014/0169501 A1 | 6/2014 | Nazarathy et al. |
| 2014/0269859 A1 | 9/2014 | Hanson et al. |
| 2014/0293894 A1 | 10/2014 | Saban et al. |
| 2014/0314061 A1 | 10/2014 | Trajkovic et al. |
| 2015/0038185 A1 | 2/2015 | Saban et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0172017 A1 | 6/2015 | Wu et al. |
| 2015/0181583 A1 | 6/2015 | Siomina et al. |
| 2016/0094318 A1 | 3/2016 | Shattil |

FOREIGN PATENT DOCUMENTS

| | | |
|---|---|---|
| CA | 2530892 C | 1/2005 |
| CN | 1430848 A | 7/2003 |
| CN | 101547447 B | 12/2010 |
| DE | 20317501 U1 | 1/2004 |
| EP | 0342858 A2 | 11/1989 |
| EP | 0355328 A2 | 2/1990 |
| EP | 0709974 A1 | 5/1996 |
| EP | 0938204 A1 | 8/1999 |
| EP | 1075109 A2 | 2/2001 |
| EP | 1085684 A2 | 3/2001 |
| EP | 1331762 A1 | 7/2003 |
| EP | 1347584 A2 | 9/2003 |
| EP | 1509002 A1 | 2/2005 |
| EP | 1553725 A1 | 7/2005 |
| EP | 1749399 A1 | 2/2007 |
| EP | 1954019 A1 | 8/2008 |
| EP | 2081334 A1 | 7/2009 |
| EP | 1850550 B1 | 8/2014 |
| GB | 2266028 A | 10/1993 |
| GB | 2313020 A | 11/1997 |
| JP | 5252559 A | 9/1993 |
| JP | 5327569 A | 12/1993 |
| JP | 5327576 A | 12/1993 |
| KR | 20110087949 A | 8/2011 |
| WO | 9413067 A1 | 6/1994 |
| WO | 9603823 A1 | 2/1996 |
| WO | 9613102 A1 | 5/1996 |
| WO | 9745956 A1 | 12/1997 |
| WO | 9748197 A2 | 12/1997 |
| WO | 9804054 A1 | 1/1998 |
| WO | 9854844 A1 | 12/1998 |
| WO | 0064106 A1 | 10/2000 |
| WO | 0180543 A2 | 10/2001 |
| WO | 0225920 A1 | 3/2002 |
| WO | 02065229 A2 | 8/2002 |
| WO | 02091618 A1 | 11/2002 |
| WO | 03024027 A1 | 3/2003 |
| WO | 2004019524 A1 | 3/2004 |
| WO | 2004068827 A1 | 8/2004 |
| WO | 2004107783 A1 | 12/2004 |
| WO | 2005022692 A2 | 3/2005 |
| WO | 2005069749 A2 | 8/2005 |
| WO | 2005083944 A1 | 9/2005 |
| WO | 2005109845 A1 | 11/2005 |
| WO | 2006052216 A1 | 5/2006 |
| WO | 2006094441 A1 | 9/2006 |
| WO | 2006105185 A2 | 10/2006 |
| WO | 2006136811 A1 | 12/2006 |
| WO | 2007069241 A2 | 6/2007 |
| WO | 2007075579 A2 | 7/2007 |
| WO | 2007133630 A2 | 11/2007 |
| WO | 2008076432 A1 | 6/2008 |
| WO | 2009053910 A2 | 4/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010077545 A1 | 7/2010 |
| WO | 2010087919 A2 | 8/2010 |
| WO | 2010090999 A1 | 8/2010 |
| WO | 2010127963 A2 | 11/2010 |
| WO | 2011043172 A1 | 4/2011 |
| WO | 2011112373 A1 | 9/2011 |
| WO | 2011160117 A1 | 12/2011 |
| WO | 2012024345 A2 | 2/2012 |
| WO | 2012054553 A1 | 4/2012 |
| WO | 2012170865 A2 | 12/2012 |
| WO | 2013009835 A1 | 1/2013 |
| WO | 2013096563 A1 | 6/2013 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Author Unknown, "SMSC LAN91C111: 10/100 Non-PCI Ethernet Single Chip MAC+PHY", Datasheet, Revision 1.92, SMSC, Jun. 27, 2011, pp. 1-133.

Author Unknown, "EIA-600.37 Symbol Encoding Sublayer," SP-3482, Revised May 12, 1995, Draft Copy, 30 pages.

Author Unknown, "Low Power Advantage of 802.11a/g vs. 802.11b", White Paper, SPLY006, Dec. 2003, Texas Instruments Incorporated, pp. 1-10.

Author Unknown, "T83027 PLL Clock Generator IC with VCXO," Product Specifications, TLSI Incorporated, Jul. 18, 2005, Huntington, NY, USA, pp. 1-6.

Zyren, J. et al., "IEEE 802.11g Offers Higher Data Rates and Longer Range", Intersil Americas LLC, Mar. 2003, pp. 1-15.

Clegg, "VIPSLAN—10 Streaks Off the Wire," Preview, LAN Times, Dec. 18, 1995, 1 page.

Author Unknown, "Visplan-10: The First Ethernet-Compatible Infrared Wireless LAN System," Application Guide, JVC, May 1996, 10 pages.

Zeino, et al., "Functional Approach to a Hybrid Wireless Network for Mobile Stations," 5th IEEE International Symposium on Personal, Indoor, and Mobile Radio Communications, Sep. 18-23, 1994, vol. 3, pp. 994-998.

Author Unknown, "Super G: Maximizing Wireless Performance", White Paper, Document No. 991-00006-001, Atheros Communications, Inc., Mar. 2004, 20 pages.

Author Unknown, "JVC Station," Technical Specifications, JVC Web Site, Accessed Jan. 18, 2007, 2 pages.

(56) References Cited

OTHER PUBLICATIONS

European Search Report dated Apr. 6, 2011 for European Patent Application No. 10182929.9, 7 pages.
European Search Report dated Apr. 5, 2011 for European Patent Application No. 10182930.7, 6 pages.
Author Unknown, "WaveLAN™ WL60040 Multimode Wireless LAN Media Access Controller (MAC)", Product Brief, Agere Systems Inc., Aug. 2003, pp. 1-10.
Author Unknown, "WaveLAN™ 802.11a/b/g Chip Set," Product Brief, Agere Systems Inc., Feb. 2003, pp. 1-6.
Author Unknown, "WaveLAN™ WL54040 Dual-Band Wireless LAN Transceiver", Product Brief, Agere Systems Inc., Sep. 2003, pp. 1-4.
Author Unknown, "ActiveLite Antenna," Publication SD-1107, Allen Telecom Group Inc., Dec. 1994, 6 pages.
Flenniken, "MicroFill Systems Engineering Design Guide," Publication SD-1131, Allen Telecom Group Inc., Jan. 1995, 12 pages.
Author Unknown, "MicroFILL, When You Have Customers in High Places, Low Places, Covered Places and Parking Places," Publication SD-1106, Allen Telecom Group Inc., Dec. 1994, 5 pages.
Author Unknown, "The Secret to MicroLite's Coverage Success," Publication SD-1115, Allen Telecom Group Inc., Jun. 1994, 4 pages.
Avery, "Standard Serves In-Building Microcellular PCS," Cellular Standard, Microwaves & RF, May 1995, 4 pages.
Author Unknown, "EIA 600.82 CAL Context Description," Revision SP3485, Revised Feb. 2, 1996, 17 pages.
Author Unknown, "EIA 600.81 Common Application Language (CAL) Specification," Revision SP3484, Revised Sep. 17, 1996, 77 pages.
Goldberg, Lee, "Broadband to the Home: Challenges on the Last Mile," Electronic Design Report, Electronic Design, Oct. 2, 1995, 9 pages.
Goldberg, Lee, "Brains and Bandwidth: Fiber Service at Copper Prices," Cover Feature, Electronic Design, Oct. 2, 1995, 5 pages.
Written Opinion of the International Searching Authority for PCT/US2009/048155 dated Aug. 20, 2009, 10 pages.
Sanchez, et al. "A high performance, versatile residential gateway", IEEE Wireless Communications and Networking conference, Sep. 23, 2000, pp. 560-565.
Rigge et al., "802.11 Wireless Chip Set Technology White Paper", Agere Systems Inc., Mar. 2003, pp. 1-12.
Dastangoo et al., "Wireless LAN Technologies and Applications," MILCOM '93 Conference Record, IEEE, Boston, Massachusetts, Oct. 11-14, 1993, vol. 2, pp. 497-501.
Author Unknown, "EIA 600.41 Description of the Data Link Layer," Revision IS-60, Jan. 31, 1996, 60 pages.
Author Unknown, "Draft IS-60.04 Node Communications Protocol; Part 6: Application Layer Specification,", Draft Copy, Revised Apr. 28, 1996, 129 pages.
Author Unknown, "EIA-600.10 Introduction to the CEBus Standard," Draft Copy, SP-3531, Revision Feb. 5, 1995, 19 pages.
Author Unknown, "Ethernet Wireless LAN System," What's New Section, BYTE Magazine, Feb. 1996, pp. 1, 5, 203.
Evans, G., "The CEBus Standard User's Guide: A Complete Technical Overview," First Edition, Grayson Evans, May 1996, 316 pages.
Dettmer, R., "GSM Over Ethernet," Data Cabling, IEE Review, Mar. 2002, pp. 37-40.
Hachman, M., "Compaq To Ride The CEBus," EBN, Jan. 22, 1996, 1 page.
Trowbridge, D., "High Cost of Wiring Sparks Wireless LAN Alternatives," Computer Technology Review, vol. XIV, No. 3, Mar. 1994, 8 pages.
Hoffman, J., "Cable, Television and the Consumer Electronic Bus," The International TV Symposium, Montreux, Switzerland, Jun. 11, 1987, Panasonic Technologies, Inc., pp. 165-173
Strassberg, D., "Home Automation Buses: Protocols Really Hit Home," Design Feature, EDN, Apr. 13, 1995, 9 pages.
Author Unknown, "54 Mbps IEEE 802.11 Wireless LAN at 2.4 GHz", White Paper, Nov. 2002, Intel Corporation, 8 pages.
Author Unknown, "JVC Introduces Ethernet Compatible Wireless LAN System," Business Wire, Inc., Sep. 26, 1995, 1 page.
Author Unknown, "JVC Introduces First Ethernet Compatible Wireless LAN System," Business Wire, Inc., Nov. 7, 1995, 1 page.
Author Unknown, "JVC Node," Technical Specifications, JVC Web Site, Accessed Jan. 18, 2007, 2 pages.
Author Unknown, "JVC PC Card & Mobile," Technical Specifications, JVC Web Site, Accessed Jan. 18, 2007, 2 pages.
Author Unknown, "JVC Power Hub," Technical Specifications, JVC Web Site, Accessed Jan. 18, 2007, 1 page.
Author Unknown, "JVC Satellite," Technical Specifications, JVC Web Site, Accessed Jan. 18, 2007, 2 pages.
Author Unknown, "JVC T-Adapter," Technical Specifications, JVC Web Site, Accessed Jan. 18, 2007,1 page.
Author Unknown, "VIPSLAN-10; An Introduction," JVC, Sep. 1995, 11 pages.
Author Unknown, "High Isolation-Surface Mount: Pin Diode Switches (Modules)," Series SWX, MCE, KDI Integrated Products, Nov. 5, 2002, Whippany, New Jersey, pp. 1-2.
Markwalter, B. E. et al., "CEBus Router Testing," IEEE Transactions on Consumer Electronics, Nov. 1991, vol. 37, No. 4, 8 pages.
Author Unknown, "Maxim MAX9993 High Linearity 1700 MHz to 2200MHz Down-Conversion Mixer with LO Buffer/Switch", Maxim Integrated Products, Oct. 2002, pp. 1-12.
Author Unknown, "Maxim MAX2450 3V, Ultra-Low-Power Quadrature Modulator/Demodulator," Maxim Integrated Products, Sep. 1998, pp. 1-8.
Author Unknown, "EIA 600.42 Node Medium Access Control Sublayer," Revision IS-60, Feb. 22, 1996, 54 pages.
Ophir et al., "802.11 Over Coax—A Hybrid Coax—Wireless Home Networking Using 802.11 Technology," Consumer Communications and Networking Conference, IEEE, Jan. 2004, 6 pages.
Elmirghani, J., "Optical Wireless Systems and Networks," IEEE Communications Magazine, IEEE, vol. 36, No. 12, Dec. 1998, pp. 70-71.
Pahlavan, et al., "Trends in Local Wireless Networks," IEEE Communications Magazine, IEEE, Issue 3, vol. 33, Mar. 1995, pp. 88-95.
Author Unknown, "EIA-600.38 Power Line/RF Symbol Encoding Sublayer," SP-3483, Revision May 12, 1995, Draft Copy, 64 pages.
Author Unknown, "Wireless Remote Controls," Powerhouse Web Site, Accessed Apr. 5, 2005, 3 pages.
Author Unknown, "Wireless Wall Switches," Powerhouse Web Site, Accessed Apr. 5, 2005, 3 pages.
Author Unknown, "EIA-600.35—RF Physical Layer & Medium Specification," Revision: IS-60, Aug. 30, 1995, 17 pages.
ZTE, "R1-123376: Discussion on ePDCCH restriction subframe clusters," 3rd Generation Partnership Project (3GPP), TSG-RAN WG1 Meeting #70, Aug. 13-17, 2012, Qingdao, China, 3 pages.
Final Office Action for U.S. Appl. No. 14/087,749, dated Jun. 2, 2017, 28 pages.
Notice of Allowance for U.S. Appl. No. 14/087,749, dated Aug. 7, 2017, 11 pages.
Examination Report for European Patent Application No. 10182930.7, dated Aug. 25, 2017, 4 pages.
Examination Report for European Patent Application No. 10182929.9, dated Sep. 15, 2017, 3 pages.
Rappaport, Theodore, et al., "Millimeter-Wave and Terahertz Wireless RFIC and On-Chip Antenna Design: Tools and Layout Techniques," Proceedings of IEEE First Workshop on Millimeter Wave and Terahertz Communications, in conjunction with IEEE Global Communications Conference (Globecom), Honolulu, HI, Nov. 30-Dec. 4, 2009, 7 pages.
Final Office Action for U.S. Appl. No. 13/920,706 dated Nov. 6, 2015, 20 pages.
Non-Final Office Action for U.S. Appl. No. 14/223,078 dated Dec. 17, 2015, 22 pages.
Notice of Allowance for U.S. Appl. No. 14/486,387 dated Oct. 13, 2015, 10 pages.
Notice of Allowance for U.S. Appl. No. 14/486,387 dated Jan. 7, 2016, 9 pages.
Notice of Allowance for U.S. Appl. No. 13/920,706, dated Feb. 11, 2016, 8 pages.

(56) References Cited

OTHER PUBLICATIONS

Translation of Notice on the Fourth Office Action for Chinese patent application 201110035156.X, dated Mar. 30, 2016, 4 pages.
Notice of Allowance for U.S. Appl. No. 13/920,706, dated May 11, 2016, 9 pages.
Notice of Allowance for U.S. Appl. No. 13/920,706, dated Sep. 1, 2016, 8 pages.
Non-final Office Action for U.S. Appl. No. 14/087,749, dated Feb. 22, 2016, 21 pages.
Final Office Action for U.S. Appl. No. 14/087,749, dated Aug. 11, 2016, 9 pages.
Non-Final Office Action for U.S. Appl. No. 14/087,749, dated Dec. 1, 2016, 28 pages.
Final Office Action for U.S. Appl. No. 14/223,078, dated Jun. 30, 2016, 26 pages.
Advisory Action for U.S. Appl. No. 14/223,078, dated Sep. 2, 2016, 3 pages.
Advisory Action and Examiner-Initiated Interview Summary for U.S. Appl. No. 14/223,078, dated Oct. 21, 2016, 3 pages.
Non-Final Office Action for U.S. Appl. No. 15/137,389, dated Jun. 7, 2016, 6 pages.
Notice of Allowance for U.S. Appl. No. 15/137,389, dated Jul. 5, 2016, 8 pages.
Non-Final Office Action for U.S. Appl. No. 14/997,659, dated Mar. 9, 2016, 7 pages.
Notice of Allowance for U.S. Appl. No. 14/997,659, dated Aug. 3, 2016, 8 pages.
Notice of Allowance for U.S. Appl. No. 14/997,659, dated Apr. 22, 2016, 8 pages.
de Valicourt, et al., "Radio-Over-Fiber Access Network Architecture Based on New Optimized RSOA Devices with Large Modulation Bandwidth and High Linearity," IEEE Transactions on Microwave Theory and Techniques, vol. 58, No. 11, Nov. 2010, pp. 3248-3258.
Notification of Reexamination for Chinese patent application 200580014468.5 dated Apr. 24, 2013, 10 pages.
Translation of Notice of Grounds for Rejection for Japanese patent application 2011-548833 dated Feb. 25, 2014, 6 pages.
International Search Report and Written Opinion for PCT/US2013/033253 dated Sep. 26, 2013, 11 pages.
Final Office Action for U.S. Appl. No. 12/674,680 dated Apr. 25, 2014, 24 pages.
Notice of Allowance and Examiner-Initiated Interview Summary for U.S. Appl. No. 12/674,680 dated Aug. 19, 2014, 10 pages.
Final Office Action for U.S. Appl. No. 13/664,013 dated Jul. 15, 2014, 31 pages.
Non-final Office Action for U.S. Appl. No. 13/664,013 dated Dec. 20, 2013, 30 pages.
Notice of Allowance for U.S. Appl. No. 13/664,013 dated Dec. 22, 2014, 8 pages.
Notice of Allowance for U.S. Appl. No. 13/664,038 dated Feb. 20, 2015, 8 pages.
Non-Final Office Action for U.S. Appl. No. 13/664,038 dated Dec. 5, 2014, 6 pages.
Non-Final Office Action for U.S. Appl. No. 13/920,706, dated Jun. 3, 2015, 20 pages.
Third Office Action for Chinese Patent Application No. 201210068309.5, dated Apr. 3, 2015, 4 pages.
International Preliminary Report on Patentability for PCT/IL2005/000111 dated Jun. 30, 2006 5 pages.
International Search Report for PCT/IL2005/000111 dated Jun. 6, 2005, 3 pages.
Translation of Notification of Grounds for Refusal for Korean patent application 10-2006-7025374 dated May 25, 2011, 2 pages.
Translation of Notification of Grounds for Refusal for Korean patent application 10-2012-7016573 dated Oct. 23, 2012, 6 pages.
Translation of Official Notice for Filing Response for Korean patent application 10-2012-7016573 dated Apr. 19, 2013, 2 pages.
Translation of Official Notice for Filing Response for Korean patent application 10-2012-7033432 dated Apr. 19, 2013, 2 pages.
Translation of Decision on Rejection for Chinese patent application 201110035156.X dated Aug. 30, 2013, 8 pages.
Official Notice for Filing Response for Korean patent application 10-2006-7025374 dated Oct. 23, 2013, 6 pages.
Non-Final Office Action for U.S. Appl. No. 14/223,078, dated Oct. 5, 2017, 33 pages.
Author Unknown, "Fiber Optic Distributed Antenna System," Installation and Users Guide, ERAU Version 1.5, May 2002, Andrews Corporation, 53 pages.
Examination Report for European Patent Application No. 08021126.1, dated Mar. 1, 2017, 4 pages.
Extended European Search Report for European Patent Application No. 08021126.1, dated Apr. 17, 2009, 7 pages.
Non-Final Office Action for U.S. Appl. No. 14/223,078, dated Mar. 24, 2017, 30 pages.

\* cited by examiner

RADIO-FREQUENCY INTEGRATED CIRCUIT (RFIC) CHIP(S) FOR PROVIDING DISTRIBUTED ANTENNA SYSTEM FUNCTIONALITIES, AND RELATED COMPONENTS, SYSTEMS, AND METHODS

PRIORITY APPLICATION

This application is a continuation of U.S. patent application Ser. No. 15/137,389, filed Apr. 25, 2016, which is a continuation of U.S. patent application Ser. No. 14/486,387, filed Sep. 15, 2014, now U.S. Pat. No. 9,338,823, which is a continuation of International App. No. PCT/US13/33253, filed Mar. 21, 2013, which claims the benefit of priority to U.S. Provisional App. No. 61/614,831, filed Mar. 23, 2012, the contents of which are relied upon and incorporated herein by reference in their entireties.

BACKGROUND

Field of the Disclosure

The technology of the disclosure relates to distributed antenna systems configured to provide communications signals over a communications medium to and from one or more remote access units for communicating with client devices.

Technical Background

Wireless communication is rapidly growing, with ever-increasing demands for high-speed mobile data communication. As an example, local area wireless services (e.g., "wireless fidelity" or "WiFi" systems) and wide area wireless services are being deployed in many different types of areas. Distributed communications or antenna systems communicate with wireless devices called "clients," "client devices," or "wireless client devices," within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from sources such as base stations. Applications where distributed antenna systems can provide wireless services include public safety, cellular telephony, wireless LANs, location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The RUs operate one or more antennas configured to support the desired frequency(ies) or polarization to provide the antenna coverage areas. Typical antenna coverage areas can have a radius in the range from a few meters to up to twenty meters. Combining a number of RUs creates an array of antenna coverage areas. Because the antenna coverage areas each cover small areas, there typically may be only a few users (clients) per antenna coverage area. This arrangement generates a uniform high quality signal enabling high throughput for the wireless system users.

Distributed antenna systems can be configured to serve a single wireless service or a combination of many wireless services operating over multiple radio bands. Different communications mediums can be employed for distributing RF signals to the RUs, such as electrical conductors (e.g., twisted pair wires, coaxial cables), optical fibers, and wireless transmissions. Distributed antenna systems can be employed in existing distributed communications systems where wireless signals are distributed over the same cabling as provided between a hub and access points (APs) in the distributed wireless communications systems.

As the wireless industry evolves, distributed antenna systems have become more sophisticated. Distributed antenna systems may require more complex electronic circuits to enable better use of limited bandwidths and to provide additional functionality. For example, electronic circuits may be employed for additional functionalities, such as interference reduction, increased output power, handling high dynamic range, and signal noise reduction. Further, the functionality of a remote unit may be included in an AP in a distributed wireless communications system. It may be desired to provide remote unit functionality in APs in a distributed wireless communications system without changing or enlarging the form factor of the APs.

SUMMARY OF THE DETAILED DESCRIPTION

Embodiments disclosed herein include radio-frequency (RF) integrated circuit (IC) (RFIC) chip(s) for providing distributed antenna system functionalities. Related distributed antenna components, systems, and methods are also disclosed. Providing distributed antenna system functionalities in RFIC chips can allow integration of multiple electronic circuits that provide multiple functionalities in a single RFIC chip or reduced RFIC chip set. Cost reductions, size reduction, increase performance, increased reliability, reduction in power consumption, and improved manufacturability in distributed antenna system electronic circuits and components are non-limiting examples of advantages that may be realized by providing RFICs in distributed antenna system components. As an example, the RFIC chip(s) can be employed in a central unit that receives communication signals of communications services for providing to remote units (RUs). As another example, the RFIC chip(s) can be employed in the remote units that provide received communications signals from the central unit to client devices. As another example, the RFIC chip(s) can be employed in distributed antenna systems and components that support RF communications services and/or digital data services.

In one embodiment, a central unit for providing communications signals in a distributed antenna system comprises a RF communications interface. The RF communications interface is configured to receive downlink RF communication signals at a RF communications frequency for a RF communications service, and to provide uplink RF communication signals at the RF communications frequency for the RF communications service. The central unit also comprises at least one RFIC chip comprising at least one of a first frequency conversion circuitry configured to shift a frequency of the downlink RF communication signals to an IF having a different frequency than the RF communications frequency (e.g., lower or higher), to provide downlink IF communications signals, and a second frequency conversion circuitry configured to shift the frequency of uplink IF communication signals to the RF communications frequency to provide the uplink RF communications signals.

In another embodiment, a method for providing communications signals in a central unit comprises receiving downlink RF communication signals at a RF communications frequency for a RF communications service in a communications interface. The method also comprises receiving uplink RF communication signals at the RF communications frequency for the RF communications service in the communications interface, shifting a frequency of the downlink RF communication signals to an intermediate frequency (IF) having a different frequency than the RF communications frequency, to provide downlink IF communications signals in a first frequency conversion circuitry, and shifting the frequency of uplink IF communication signals to the RF communications frequency to provide the uplink RF communications signals in a second frequency conversion circuitry. The method also comprises at least one of the first frequency conversion circuitry and the second frequency conversion circuitry provided in at least one RFIC chip.

In another embodiment, a remote unit for providing received communications signals in a distributed antenna system comprises a RF communications interface. The RF communications interface is configured to receive downlink IF communication signals at an IF for a RF communications service over a communications medium from a central unit. The RF communications interface is also configured to receive uplink RF communication signals at a RF communications frequency for the RF communications service. The RU further comprises at least one RFIC chip comprising at least one of a first frequency conversion circuitry configured to shift a frequency of downlink IF communication signals to a RF communications frequency of RF communications service to radiate downlink RF communications signals over a first antenna element, and a second frequency conversion circuitry configured to shift the frequency of uplink RF communication signals received from a second antenna element to the IF to provide uplink IF communications signals.

In another embodiment, a method of providing received communications signals in a RU is provided. The method comprises receiving downlink IF communication signals at an IF for a RF communications service in a RF communications interface. The method also comprises receiving uplink RF communication signals at a RF communications frequency for the RF communications service in a RF communications interface, and shifting a frequency of downlink IF communication signals to the RF communications frequency of the RF communications service in a first frequency conversion circuitry provided in at least one RFIC chip, to radiate downlink RF communications signals over a first antenna element. The method also comprises shifting the frequency of uplink RF communication signals received from a second antenna element to the IF in a second frequency conversion circuitry provided in the RFIC chip, to provide uplink IF communications signals.

In another embodiment, a distributed antenna system comprises one or more remote units (RUs), and a central unit having a central unit radio-frequency (RF) communications interface. The central unit RF communications interface is configured to receive downlink RF communication signals at a RF communications frequency for a RF communications service, and to receive uplink RF communication signals at the RF communications frequency for the RF communications service. The central unit also comprises a down conversion RFIC chip that comprises down conversion circuitry configured to shift the frequency of the downlink RF communication signals to an intermediate frequency having a different (e.g., lower or higher) frequency than the RF communications frequency, to provide downlink IF communications signals. The central unit also comprises an up conversion RFIC chip having up conversion circuitry configured to shift the frequency of uplink IF communication signals to the RF communications frequency to provide the uplink RF communications signals. The central unit also comprises a central unit communications interface comprising communications circuitry. The communications circuitry is configured to receive the downlink IF communication signals and provide the downlink IF communications signals to one or RUs over a communications medium, and to receive the uplink IF communication signals from the one or more RUs over the communications medium and provide the uplink IF communication signals to the up conversion RFIC chip. The one or more RUs each comprise a RU communications interface configured to receive the downlink IF communication signals from the central unit for the RF communications service. The RU communications interface is also configured to receive uplink RF communication signals at a RF communications frequency for the RF communications service. The one or more RUs also each comprise an up conversion RFIC chip having up conversion circuitry configured to shift the frequency of downlink IF communication signals to the RF communications frequency to radiate the downlink RF communications signals over a first antenna element. The one or more RUs also each comprise a down conversion RFIC chip having down conversion circuitry configured to shift the frequency of uplink RF communication signals received from a second antenna element to the IF to provide the uplink IF communications signals.

The central units and RUs can support both RF communication services and digital data services. These services can be wired or wireless communications services that are typically communicated wirelessly, but may be provided over non-wireless medium (e.g., electrical conductor and/or optical fiber). The RF communication services and digital data services can be provided over any type of communications medium, including electrical conductors and optical fiber to wireless client devices, such as remote units for example. Examples of digital data services include LAN using Ethernet, WLAN, WiMax, WiFi, Digital Subscriber Line (DSL), telephony, WCDMA, and LTE, which can support voice and data. Digital data signals can be provided over separate communications media or a common medium for providing RF communication services.

Additional features and advantages will be set forth in the detailed description, and in part will be readily apparent to those skilled in the art from that description or recognized by practicing the embodiments as described herein.

The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include radio-frequency (RF) integrated circuit (RFIC) chip(s) for providing distributed antenna system functionalities. Related distributed antenna elements, systems, and methods are also disclosed. Providing distributed antenna system functionalities in RFIC chips can allow integration of multiple electronic circuits that provide multiple functionalities in a single RFIC chip or reduced RFIC chip set. Cost reductions, size reduction, increased performance, increased reliability, reduction in power, and improved manufacturability in distributed antenna system electronic circuits and components are non-limiting examples of advantages that may be realized by providing RFICs in distributed antenna system components. As one example, the RFIC chip(s) can be employed in a central unit that receives communication signals of communications services for providing to remote units (RUs). As another example, the RFIC chip(s) can be employed in the RUs that provide received communications signals from the central unit to client devices. As another example, the RFIC chip(s) can be employed in distributed antenna systems and components that support RF communications services and/or digital data services.

Figure 1:
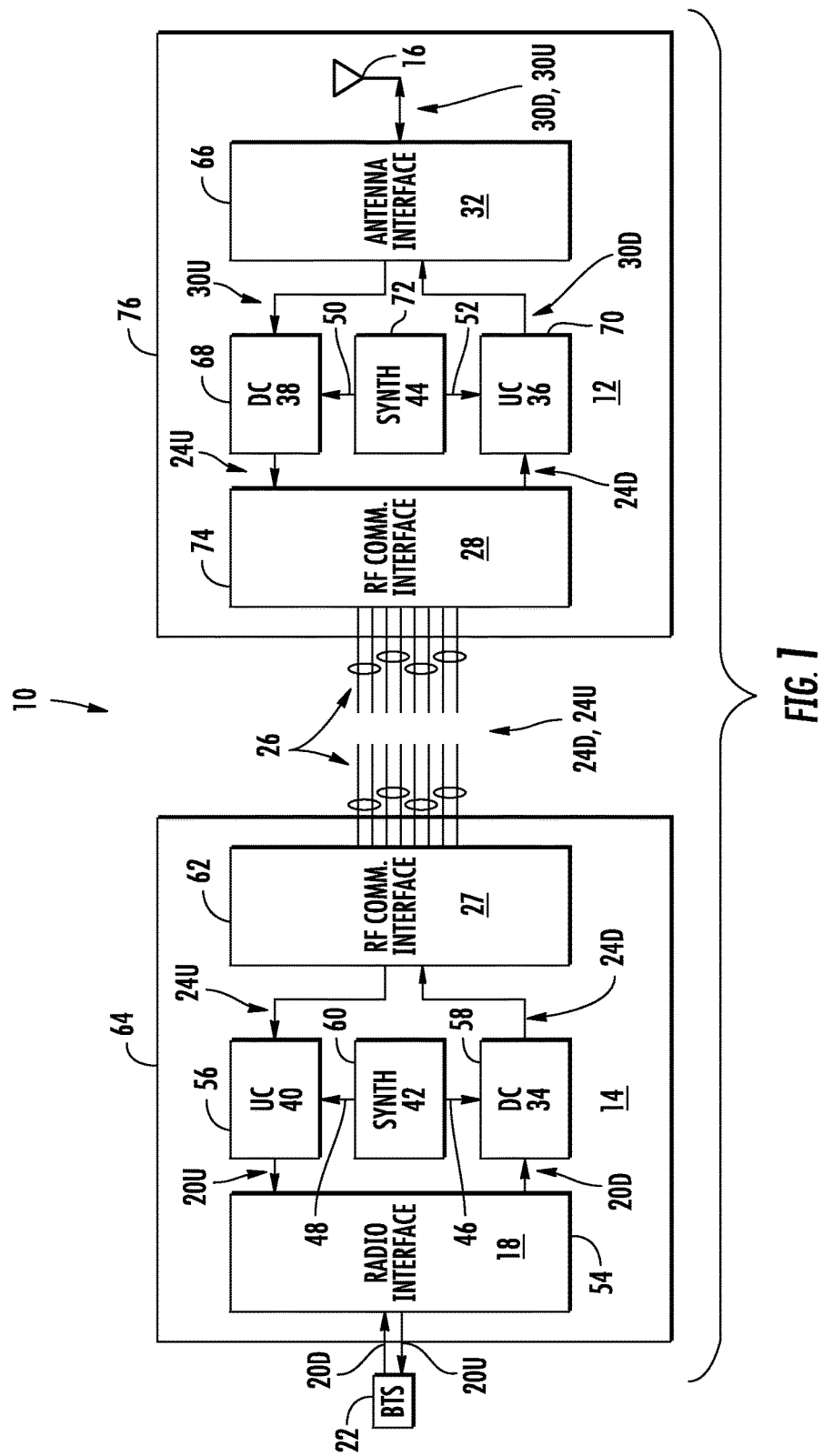
FIG. 1 is a schematic diagram of an exemplary single radio band distributed radio-frequency (RF) antenna system employing RF integrated circuit (RFIC) chips for providing RF communications services to remote units (RUs)

In this regard, FIG. 1 is a schematic diagram of an exemplary single radio band distributed radio-frequency (RF) antenna system 10 employing RF integrated circuit (RFIC) chips for providing RF communications services. The distributed antenna system 10 is configured to create one or more antenna coverage areas for establishing communications with wireless client devices located in the RF range of the antenna coverage areas created by remote units (RUs) 12. The remote units 12 may also be termed "remote antenna units" if they contain one or more antennas to support wireless communications. The distributed antenna system 10 provides any type of RF communication services desired, for example cellular radio services as a non-limiting example. In this embodiment, the distributed antenna system 10 includes a central unit 14, one or more RUs 12, and a communications medium 26 that communicatively couples the central unit 14 to the RU 12. The central unit is configured to provide RF communication services to the RU 12 for wireless propagation to client devices in communication range of an antenna 16 of the RU 12. The RU 12 may also be configured to support wired communications services. Note that although only one RU 12 is illustrated as being communicatively coupled to the central unit in FIG. 1, a plurality of RUs 12 can be communicatively coupled to the central unit 14 to receive RF communication services from the central unit 14.

With continuing reference to FIG. 1, the central unit 14 includes a radio interface 18 (or RF interface) that is configured to receive downlink RF communication signals 20D for RF communication services to be provided to the RU 12. For example, the RF communications service may be a cellular radio service, but could also be any other type of RF communications service. The radio interface 18 may receive the downlink RF communications signals 20D to be provided to the RU 12 from a base transceiver station (BTS) 22. As will be discussed in more detail below, the central unit 14 is configured to provide downlink RF communication signals 24D through a communications interface 27 to provide the RF communication services based on the downlink RF communications signals 20D over a communications medium 26 to the RU 12. The communications interface 27 could include a cable interface that interfaces with a cable medium (e.g., coaxial cable, fiber optic cable) for sending and receiving communications signals. The RU 12 includes a communications interface 28 configured to receive the downlink RF communication signals 24D and provide downlink RF communication signals 30D providing the RF communications services to an antenna interface 32. The antenna 16 electrically coupled to the antenna interface 32 is configured to wirelessly radiate the downlink RF communication signals 30D to wireless clients in wireless communication range of the antenna 16. The communications interface 28 could include a cable interface that interfaces with a cable medium (e.g., coaxial cable, fiber optic cable) for sending and receiving communications signals, including the downlink RF communication signals 30D.

The downlink RF communication signals 24D, 30D may be the same signals as the downlink RF communication signals 20D. Alternatively, as provided in the distributed antenna system 10 of FIG. 1, the downlink RF communications signals 20D are frequency shifted by down converter circuitry (DC) 34 to provide downlink RF communications signals 24D. The downlink RF communications signals 20D are downconverted to the downlink communications signals 24D to an intermediate frequency (IF) different from (e.g., lower or higher than) the frequency of downlink communications signals 20D. To recover the downlink RF communication signals 20D at the RU 12 to be radiated by the antenna 16, an up converter circuitry (UC) 36 is provided in the RU 12 to up convert the downlink RF communications signals 24D to the downlink RF communications signals 30D. The downlink RF communication signals 30D are of the same or substantially the same frequency as the downlink RF communications signals 20D in this embodiment. The downlink RF communication signals 30D may be frequency locked to the downlink RF communications signals 20D, such as through employing a frequency correction circuit in the UC 36. The downlink RF communication signals 30D may be phase locked to the downlink RF communications signals 20D, such as through employing a phase locked loop (PLL) circuit in the UC 36 as another non-limiting example.

With continuing reference to FIG. 1, the radio interface 18 is also configured to receive uplink RF communication signals 20U to provide uplink communications received at the RU 12 from wireless client devices to the central unit 14. In this regard, the radio interface 18 receives the uplink RF communications signals 24U from the RU 12 via the communications interfaces 28, 27 in the RU 12 and central unit 14, respectively. The RU 12 is configured to provide the uplink RF communication signals 24U through the communications interface 28 to provide uplink communications for the RF communication services over the communications medium 26 to the communications interface 27 of the central unit 14. The uplink RF communication signals 24D are based on the uplink RF communication signals 30U received by the antenna 16 of the RU 12 from wireless client devices. The uplink RF communications signals 24U may be the same signals as the uplink RF communication signals 30U.

Alternatively, with continuing reference to FIG. 1, the downlink RF communications signals 24D are frequency shifted by down converter circuitry (DC) 38 in the RU 12 to provide uplink RF communications signals 24U. The uplink RF communications signals 30U are downconverted to the uplink communications signals 24U to an intermediate frequency (IF) that is different from the frequency of downlink communications signals 30U. To recover the uplink RF communication signals 30U at the central unit 14 to be provided to the BTS 22, an up converter circuitry (UC) 40 is provided in the central unit 14 to up convert the uplink RF communications signals 24U to the uplink RF communications signals 20U. The uplink RF communication signals 20U are of the same or substantially the same frequency as the uplink RF communications signals 30U in this embodiment. The uplink RF communication signals 20U may be frequency locked to the uplink RF communications signals 30U, such as through employing a frequency locked loop (FLL) circuit in the UC 40. The uplink RF communication signals 20U is phase locked to the uplink RF communications signals 30U, such as through employing a phase locked loop (PLL) circuit in the UC 40.

The communications medium 26 in the distributed antenna system 10 could be any number of mediums. For example, the communications medium may be electrical conductors, such as twisted-pair wiring or coaxial cable. Frequency division multiplexing (FDM) or time division multiplexing (TDM) can be employed to provide RF communications signals between the central unit 14 and multiple RUs 12 communicatively coupled to the central unit 14 over the same communication medium 26. Alternatively, separate, dedicated communications medium 26 may be provided between each RU 12 and the central unit 14. The UCs 36, 40, and DCs 38, 34 in the RUs 12 and the central unit 14 could be provided to frequency shift at different IFs to allow RF communications signals from multiple RUs 12 to be provided over the same communications medium 26 without interference in RF communications signals (e.g., if different codes or channels not employed to separate signals for different users).

Also, for example, the communications medium 26 may have a lower frequency handling rating that the frequency of the RF communication service. In this regard, the down conversion of the downlink and uplink RF communication signals 20D, 30U can frequency shift the signals to an IF that is within the frequency rating of the medium 26. The communications medium 26 may have a lower bandwidth rating than the bandwidth requirements of the RF communications services. Thus, again, the down conversion of the downlink and uplink RF communication signals 20D, 30U can frequency shift the signals to an IF that provides a bandwidth range within the bandwidth range of the medium 26. For example, the distributed antenna system 10 may be configured to be employed using an existing communications medium 26 for other communications services, such as digital data services (e.g., WLAN services). For example, the medium 26 may be CAT 5, CAT 6, or CAT 7 conductor cable that is used for wired services such as Ethernet based LAN as non-limiting examples. In this example, down conversion ensures that the downlink and uplink RF communications signals 24D, 24U can be communicated with acceptable signal attenuation.

With continuing reference to FIG. 1, synthesizer circuits 42, 44 are provided to provide RF reference signals for frequency conversion by the DCs 34, 38 and the UCs 40, 36 in the central unit 14 and the RU 12, respectively. The synthesizer circuitry 42 is provided in the central unit 14. The synthesizer circuitry 44 is provided in the RU 12. The synthesizer circuit 42 in the central unit 14 provides one of more local oscillator (LO) signals 46 to the DC 34 for frequency shifting the downlink RF communications signals 20D to the downlink RF communications signals 24D at a different, intermediate frequency (IF). The synthesizer circuit 42 also provides one of more RF reference signals 48 to the UC 40 for frequency shifting the uplink RF communications signals 24U from the IF to the frequency of the RF communication services to provide the uplink RF communications signals 20U.

As a non-limiting example, the LO signals 46, 48 may be directly provided to mixers in the DC 34 and UC 40 to control generation of mixing RF signals (not shown) to be mixed with the downlink RF communications signals 20D and the uplink RF communications signals 24U, respectively, for frequency shifting. As another non-limiting example, the LO signals 46, 48 may not be provided directly to mixers in the DC 34 and UC 40. The LO signals 46, 48 may be provided to control other circuitry that provides signals to control the mixers in the DC 34 and the UC 40. The oscillators in the DC 34 and the UC 40 generate mixing RF signals to be mixed with the downlink RF communications signals 20D and the uplink RF communications signals 24U, respectively, for frequency shifting.

The synthesizer circuit 44 in the RU 12 provides one or more LO 50 to the DC 38 for frequency shifting the uplink RF communications signals 30U to the uplink RF communications signals 24U at a different, intermediate frequency (IF). The synthesizer circuit 44 also provides one or more LO signals 52 to the UC 36 for frequency shifting the downlink RF communications signals 24D from the IF to the frequency of the RF communications services to provide the uplink RF communication signals 30D. As an example, the LO signals 50, 52 may be directly provided to mixers in the DC 38 and UC 36 to control generation of mixing RF signals (not shown) to be mixed with the downlink RF communications signals 24D and the uplink RF communications signals 30U, respectively, for frequency shifting. As another non-limiting example, the LO signals 50, 52 may not be provided directly to mixers in the DC 38 and UC 36. The LO signals 50, 52 may be provided to control other circuitry that provides signals to control the mixers in the DC 38 and the UC 36. The oscillators in the synthesizer circuit 44 and the UC 36 generate mixing RF signals to be mixed with the downlink RF communications signals 24D and the uplink RF communications signals 30U, respectively, for frequency shifting.

As will be discussed in more detail below, the distributed antenna system 10 in FIG. 1 includes one or more RFIC chips for providing the distributed antenna system functionalities, including those functionalities discussed above. A RFIC chip is a specially designed integrated circuit that includes desired groupings of circuits or components described herein for realizing specific functionalities. By providing RFIC chips, part count and/or board area (or density) for circuits or components described herein may be reduced. As a non-limiting example, a RFIC chip may enable all electronic circuits for the central unit 14 or a RU 12 to be provided with less than seventy percent (70%) of cost, fifteen integrated circuits, and/or four hundred (400) passive components, as compared to designs that do not employ RFIC chips. As another example, RFIC chips can enable electronic circuits to be provided in a square area of less than 100 cm$^2$.

Providing distributed antenna system 10 functionalities in RFIC chips can allow integration of multiple electronic circuits that provide multiple functionalities in a single RFIC chip or reduced RFIC chip set. Cost reductions, size reduction, increased performance, increased reliability, and improved manufacturability in electronic circuits are non-limiting examples of advantages that may be realized through use of RFICs in the distributed antenna system 10 components.

With continuing reference to the distributed antenna system 10 in FIG. 1, the radio interface 18 in the central unit 14 contains radio interface circuitry that can be included in a radio interface RFIC chip 54. The UC 40 in the central unit 14 contains up conversion circuitry that can be included in an up conversion RFIC chip 56. The DC 34 in the central unit 14 contains down conversion circuitry that can be included in a down conversion RFIC chip 58. The synthesizer circuitry 42 in the central unit 14 can be included in a synthesizer RFIC chip 60. The communications interface 27 in the central unit 14 contains communications interface circuitry that can be included in a communications interface RFIC chip 62. Alternatively, the radio interface 18, the UC 40, the DC 40, the synthesizer circuitry 42, and the communications interface 27, or any combination or subset thereof, could be included in a single central unit RFIC chip 64.

With continuing reference to FIG. 1, the antenna interface 32 in the RU 12 contains antenna interface circuitry that can be included in an antenna interface RFIC chip 66. The DC 38 in the RU 12 contains down conversion circuitry that can be included in a down conversion RFIC chip 68. The UC 36 in the RU 12 contains up conversion circuitry that can be included in an up conversion RFIC chip 70. The synthesizer circuitry 44 in the RU 12 can be included in a synthesizer RFIC chip 72. The communications interface 28 in the RU 12 contains communications interface circuitry that can be included in a communications interface RFIC chip 74. Alternatively, the antenna interface 32, the UC 36, the DC 38, the synthesizer circuitry 44, and the communications interface 28, or any combination or subset of the foregoing, could be included in a single RU RFIC chip 76.

The central unit 14 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, and WLAN frequencies. The central unit 14 may support frequency division duplexing (FDD) and time divisional duplexing (TDD).

In another embodiment, an exemplary RU 12 may be configured to support up to four (4) different radio bands/carriers (e.g. ATT, VZW, T-Mobile, Metro PCS: 700LTE/850/1900/2100). Radio band upgrades can be supported by adding remote expansion units over the same communications media (or upgrade to MIMO on any single band). The RUs 12 and/or remote expansion units may be configured to provide external filter interface to mitigate potential strong interference at 700 MHz band (Public Safety, CH51,56); Single Antenna Port (N-type) provides DL output power per band (Low bands (<1 GHz): 14 dBm, High bands (>1 GHz): 15 dBm); and satisfies the UL System RF spec (UL Noise Figure: 12 dB, UL IIP3: −5 dBm, UL AGC: 25 dB range).

It may be desirable to provide both digital data services and RF communications services for wireless client devices in a distributed antenna system that employs an automatic antenna selection arrangement. Examples of digital data services include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 2:
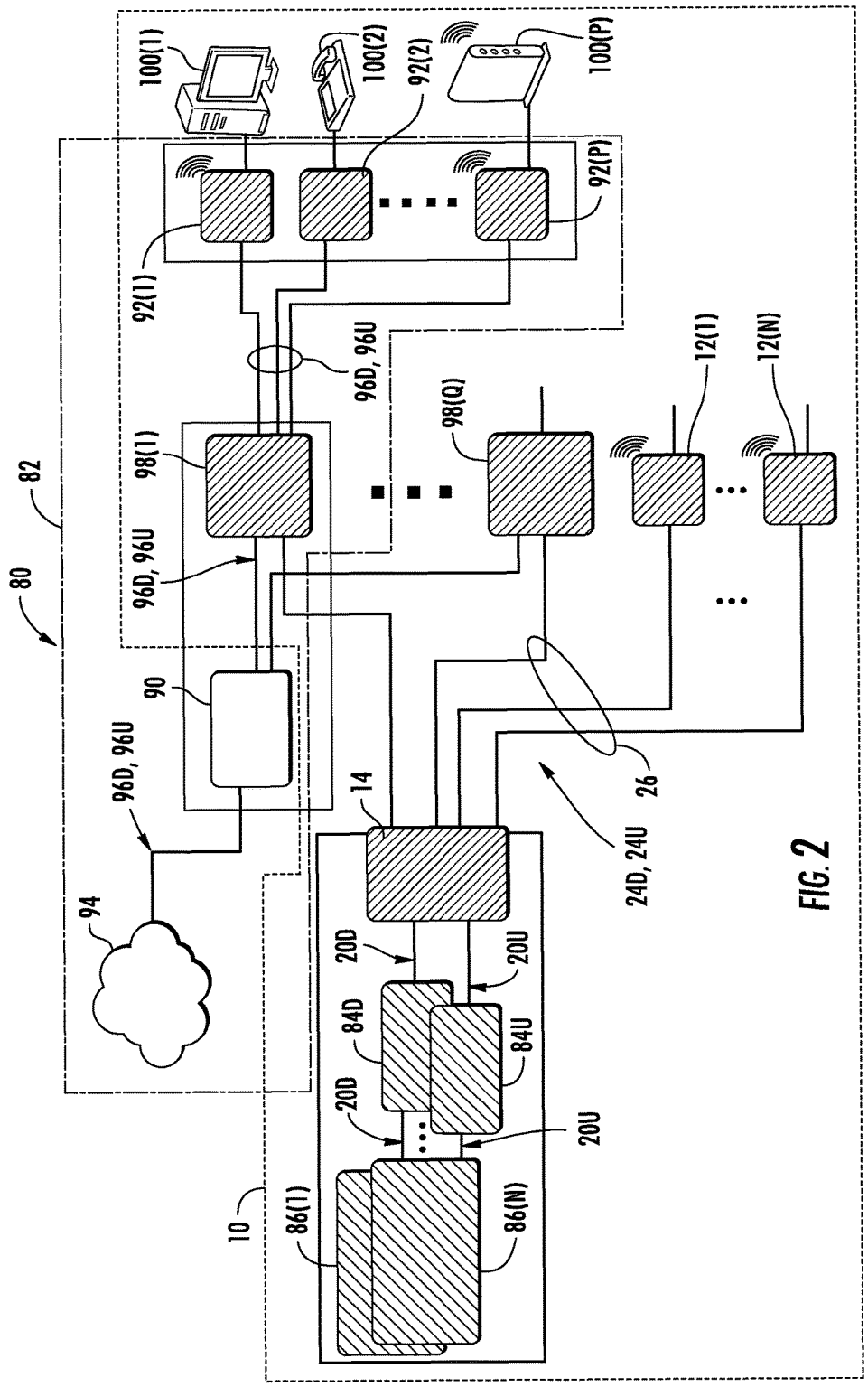
FIG. 2 is a schematic diagram of an exemplary distributed antenna system that includes the distributed RF communications system in FIG. 1 and a distributed wireless local access network (WLAN) system for providing digital data services to WLAN access points (APs), wherein the distributed WLAN and RF communications systems share a distribution communications media.

In this regard, FIG. 2 is a schematic diagram of an exemplary distributed antenna system 80 that includes the distributed RF communications system 10 in FIG. 1 and a wireless local access network (WLAN) system 82 for providing digital data services. The distributed antenna system 10 includes the central unit 14 described above with regard to FIG. 1. The central unit 14 is configured to receive the downlink electrical communications signals 20D through downlink interfaces 84D from one or more base stations 86(1)-86(N), wherein N can be any number. The central unit 14 can be configured receive RF communications services from multiple base stations 86(1)-86(N) to support multiple RF radio bands in the system 10. The central unit 14 is also configured to provide the downlink RF communication signals 24D to the RUs 12(1)-12(N and receive the uplink RF communications signals 24U from RUs 12(1)-12(N) over the communications medium 26. M number of RUs 12 signifies that any number, M number, of RUs 12 can be communicatively coupled to the central unit 14.

With continuing reference to FIG. 2, a digital data switch 90 may also be provided in the WLAN system 82 for providing digital data signals, such as for WLAN services for example, to RUs 92(1)-92(P) configured to support digital data services, wherein P signifies that any number of the RUs 92 may be provided and supported by the WLAN system 82. The digital data switch 90 may be coupled to a network 94, such as the Internet. Downlink digital data signals 96D from the network 94 can be provided to the digital data switch 90. The downlink digital data signals 96D can be then provided to the RUs 92(1)-92(P) through slave central units 98(1)-98(Q), wherein Q can be any number desired. The digital data switch 90 can also receive uplink digital data signals 96U from the RUs 92(1)-92(P) to be provided back to the network 94. The slave central units 98(1)-98(Q) also receive the downlink RF communications signals 24D and provide uplink RF communications signals 24U from the RUs 92(1)-92(P) to the central unit 14 in this embodiment. In this regard, the RUs 92(1)-92(P), by being communicatively coupled to a slave central unit 98(1) that supports both the RF communications services and the digital data services, is included in both the distributed antenna system 10 and the WLAN system 82 to support RF communication services and digital data services, respectively, with client devices 100(1)-100(P). For example, such RU 92 may be configured to communicate wirelessly with the WLAN user equipment (e.g., a laptop) and Wide Area Wireless service user equipment (e.g., a cellular phone).

Figure 3:
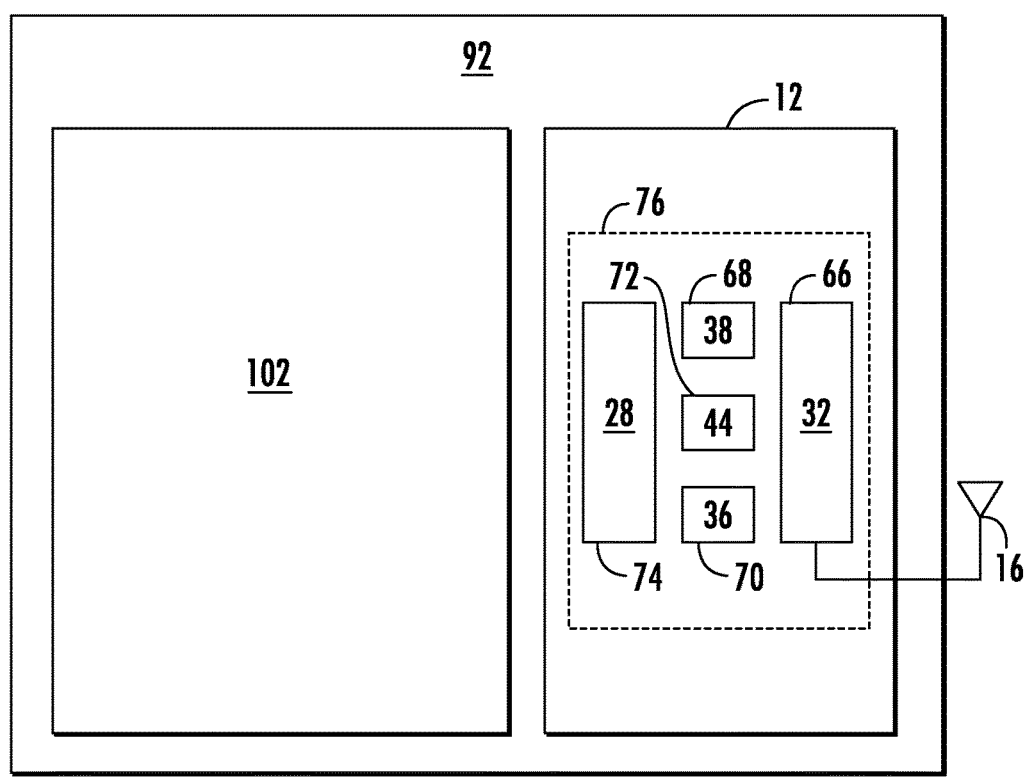
FIG. 3 is a schematic diagram of an RU that can be included in the system in FIG. 2, wherein the RU includes combined functionality of an AP and a RF antenna unit to support digital data services and RF communications services.

FIG. 3 is a schematic diagram of the RU 92 in FIG. 2 that can support both RF communications services and digital data services. As illustrated in FIG. 3, the RU 92 includes a digital data services AP 102 (hereinafter "AP 102"), which may be an AP, and the RU 12 previously described in regard to FIG. 1. In this manner, the RU 92 includes the circuitry to support both digital data services via the AP 102 and RF communication services via the RU 12. For example, the AP 102 may be a WLAN digital data service module or board. The AP 102 may be an AP that is commonly available. By providing the RFIC chip(s) in the RU 12, the RU 12 can be provided in a reduced size and form factor that may allow the RU 12 to be provided in an existing form factor of the AP 102 and in a cost effective manner.

Figure 4:
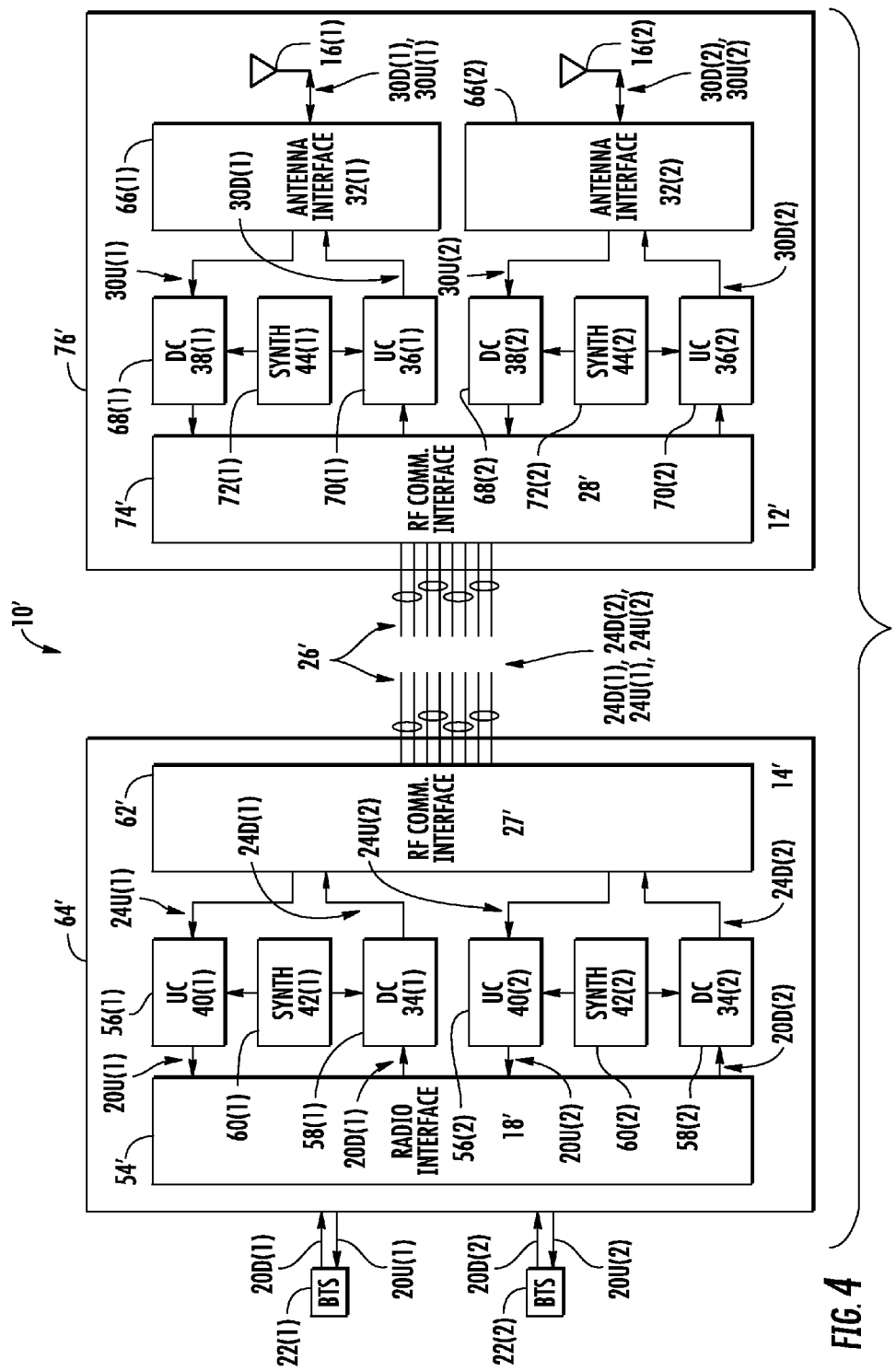
FIG. 4 is a schematic diagram of a dual radio band distributed RF communications system employing RFIC chips for providing RF communications services to RUs.

FIG. 4 is a schematic diagram of an exemplary dual radio band distributed RF antenna system 10' employing RF integrated circuit (RFIC) chips for providing RF communications services to RUs 12'. The distributed antenna system 10' employs a central unit 14' communicatively coupled to one or more RUs 12' that can provide multiple radio bands. Only two radio bands are illustrated in FIG. 4 as being provided in the distributed antenna system 10', however, the system 10' and its components could be configured to provide any number of radio bands, as desired. Common element numbers between components in the distributed antenna system 10' in FIG. 4 and the distributed antenna system 10 in FIG. 1 denote common elements and functionality, and thus will not be re-described. The notations (1) and (2) signify common elements, but two of the elements provided, each for supporting a radio band among the two supported radio bands. Other combinations of radio bands may also be created using the RFIC chip(s) (e.g., triple band, quadro band etc.).

With continuing reference to FIG. 4, because the distributed antenna system 10' in FIG. 4 is shown as supporting two radio bands, the central unit 14' is configured to receive downlink RF communications signals 20D(1), 20D(2) from two BTSs 22(1), 22(2) and receive uplink RF communications signals 24U(1), 24U(2) from the RU 12'. The radio interface 18' is configured to provide the downlink RF communications signals 20D(1), 20D(2) to two dedicated circuitries, one for each radio band. UC 40(1), synthesizer circuitry 42(1), and DC 34(1) are provided to support the first radio band. UC 40(2), synthesizer circuitry 42(2), and DC 34(2) are provided to support the second radio band. Similarly, the RU 12' is configured to receive downlink RF communications signals 24D(1), 24D(2) from the central unit 14', and receive uplink RF communications signals 30U(1), 30U(2) for distribution to the central unit 14'. The communications interface 28' is configured to provide the downlink RF communications signals 24D(1), 24D(2) to two dedicated circuitries, one for each radio band. UC 36(1), synthesizer circuitry 44(1), and DC 38(1) are provided to support the first radio band. UC 36(2), synthesizer circuitry 44(2), and DC 38(2) are provided to support the second radio band.

With continuing reference to FIG. 4, first and second antennas 16(1), 16(2) are coupled to antenna interfaces 32(1), 32(2) to support the two radio bands. The first and second antennas 16(1), 16(2) could be provided as antenna elements as part of a single antenna that has dual radio band capability of the RU 12'. Alternatively, the first and second antennas 16(1), 16(2) could be provided as separate antennas to provide the dual radio band capability of the RU 12'.

Just as provided in the distributed antenna system 10 in FIG. 1, the circuitry of the distributed antenna system 10' can be included in a RFIC chips. As one example, the same RFIC chips illustrated in the distributed antenna system 10 in FIG. 1 can be provided in the distributed antenna system 10' in FIG. 4. Two RFIC chips are provided in the distributed antenna system 10' in FIG. 4 for each RFIC chip in the distributed antenna system 10 in FIG. 1, with the notations (1) and (2) to signify RFIC chips supporting circuitry for the first radio band or the second radio band, respectively.

Also note that although in this example in FIG. 4, the DCs 34 is provided in the downlink communications path to downconvert the downlink RF communications signals and the UCs 40 are provided in the uplink communications path to upconvert the uplink RF communications signals, the opposite configuration could be provided. That is, the UCs 40 could be provided in the downlink communications path to upconvert the downlink RF communication signals, and the DCs 34 be provided in the uplink communications path to downconvert the uplink RF communications signals. These frequency conversion circuitries can be also referred to generally as first, second, third, etc. frequency conversion circuitries.

Figure 5:
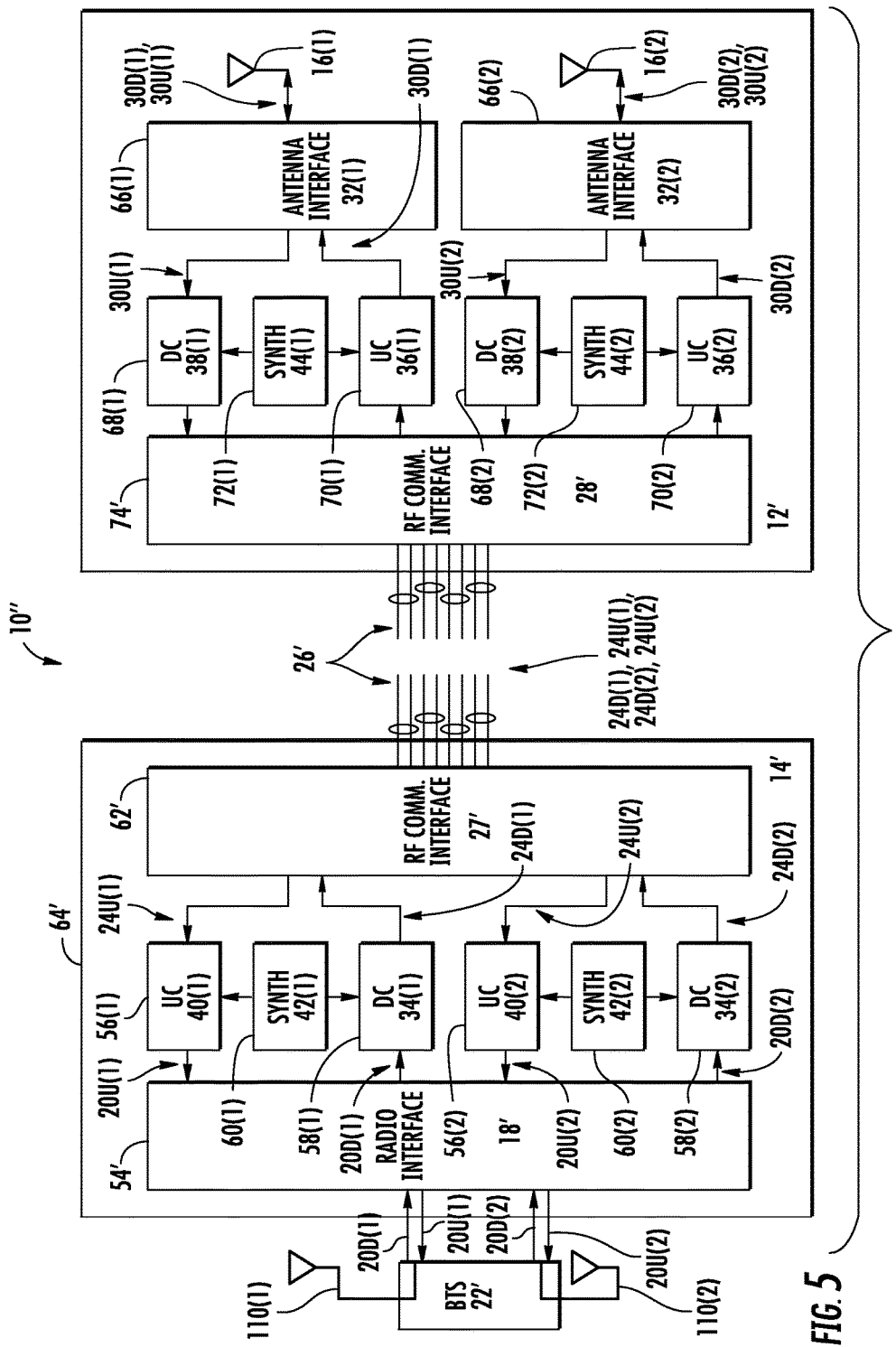
FIG. 5 is a schematic diagram of a single band multiple-input/multiple-output (MIMO) distributed RF communications system employing RFIC chips.

FIG. 5 is a schematic diagram of an exemplary single band, multiple-input/multiple-output (MIMO) distributed RF communications system 10" employing RFIC chips for providing RF communications services to the RUs 12'. The distributed antenna system 10" includes common elements, signified by common element numbers, with the distributed antenna system 10' in FIG. 4, and thus will not be re-described. The two antennas 16(1), 16(2) in the RU 12' are configured to provide downlink RF communications signals 30D(1), 30D(2) and receive uplink RF communications signals 30U(1), 30U(2) of the same RF frequency to support MIMO RF communications services. The notations (1) and (2) in this example signify 2×2 MIMO RF communications signal paths, but other higher MIMO communications schemes (e.g., 4×4) can also be provided with appropriate scaling.

The communications medium 26' is configured to either provide separate communications paths for the downlink RF communications signals 24U(1), 24U(2) providing multiple downlink communications paths, and the uplink RF communications signals 24U(1), 24U(2) providing multiple uplink communications paths. Alternatively, common paths in the communications medium 26' could be employed for downlink RF communications signals 24U(1), 24U(2) and the uplink RF communications signals 24U(1), 24U(2). DCs 34(1), 34(2) could be configured to frequency shift the downlink RF communication signals 24D(1), 24D(2) to different IFs to avoid interference between the multiple downlink communications paths. Similarly, the DCs 38(1), 38(2) could be configured to frequency shift the uplink RF communication signals 30D(1), 30D(2) to different IFs to avoid interference between the multiple uplink communications paths.

Figure 6:
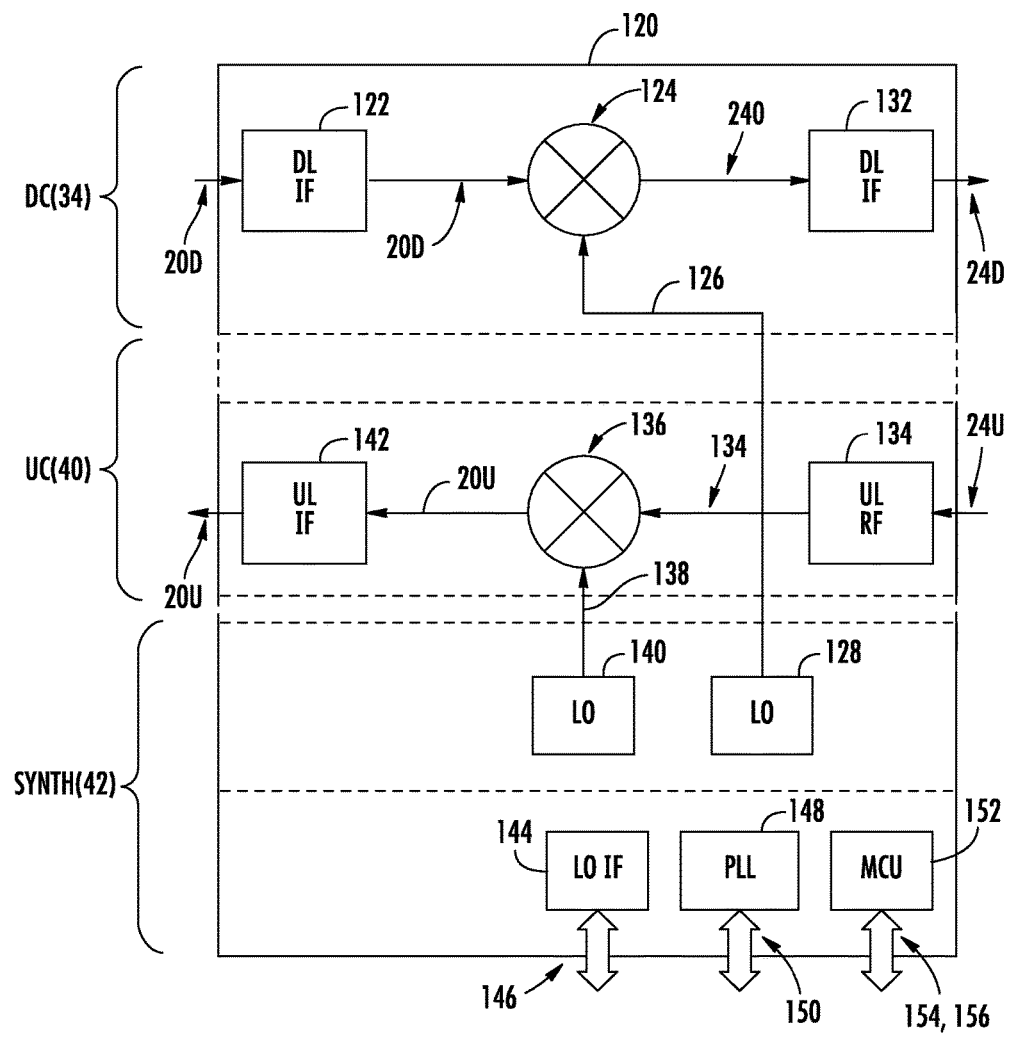
FIGS. 6-8 are schematic diagrams of exemplary RFIC architectures that can be provided in a central unit supporting RF communications services to RUs.

The DC 34, UC 40, and synthesizer circuitry 42 in the central unit 14 in FIGS. 4 and 5 can be provided in differing configurations and organizations in one or more RFIC chips. For example, FIG. 6 is a schematic diagram of exemplary RFIC chip architectures that can be provided in the central unit 14 for supporting RF communications to RUs 12 in a distributed antenna system, including the distributed antenna system described above. With reference to FIG. 6, in one example, the DC 34, UC 40, and synthesizer circuitry 42 can be provided in a single RFIC chip 120. In this regard, the DC 34 is comprised of a downlink interface (DL IF) 122 that receives the downlink electrical communication signals 20D. The DL IF 122 provides the downlink electrical communication signals 20D to a downconversion mixer 124. The downconversion mixer 124 also receives a local oscillator signal 126 from a local oscillator 128 in the synthesizer circuitry 42. The local oscillator signal 126 serves as a reference to the downconversion mixer 124 for downconverting the frequency of the downlink electrical RF communications signals 20D to downlink electrical RF signals 130D at a different intermediate frequency than the frequency of the downlink electrical RF communication signals 20D. The downlink electrical RF communication signals 24D are provided to a downlink RF circuit 132 to provide the downlink RF signals 24D to the RF communications interface 62 as shown in FIGS. 4 and 5.

With continuing reference to FIG. 6, the uplink RF communications signals 24U are received by an uplink RF circuit 134 in the RFIC chip 120. The uplink RF communications signals 24U are provided from the uplink RF circuit 134 to an upconversion mixer 136 to be combined with a local oscillator signal 138 from a local oscillator 140. The local oscillator signal 138 is provided such that its frequency is mixed with the downlink RF communications signals 24U to upconvert the frequency from an intermediate frequency to the RF frequency to be provided as the uplink electrical RF communications signals 20U. The uplink electrical RF communications signals 20U are provided to an uplink interface 142 which then provides the uplink electrical RF communications signals 20U to the radio interface 54.

With continuing reference to FIG. 6, the synthesizer circuit, in addition to containing the local oscillators 128, 140 also include several other exemplary components. For example, the synthesizer circuitry 42 contains a local oscillator interface circuit 144 that is configured for generating and decoding management signals 146. For example these management signals 146 may be amplitude shift key (ASK) management signals. The management signals 146 may be provided to control the local oscillators 128, 140 including when the local oscillators 128, 140 are activated and deactivated. The management signals 146 may also contain other information unrelated to the local oscillators 128, 140 for providing other information to the central unit 14 and/or its components. The synthesizer circuitry 42 in FIG. 6 also contains a phase lock loop (PLL) circuit 148 that is configured to measure the frequency ratio between a local lock source signal 150 and the management signal 146 and update the local oscillators 128, 140 to provide accurate frequency and clean local oscillator signals 126, 138. The synthesizer circuitry 42 may also contain a micro-controller unit 152 that is configured to receive controller signals 154 and to provide controller output signals 156 for reporting, monitoring, and or controlling the components in the RFIC chip 120 as desired.

Note that although the DC 34, the UC 40, the synthesizer circuitry 42 are provided in the same RFIC chip 120 in FIG. 6, other organizations with regard to RFIC chip partitioning are possible. For example, the DC 34, the UC 40, and the synthesizer circuitry 42 could be provided in separate RF chips as shown by the dashed lines in FIG. 6. As another example, the DC 34 and the UC 40 could be provided in one RFIC chip and the synthesizer circuitry 42 provided in a separate RFIC chip. In that configuration, the local oscillators 128, 140 may be included in the same RFIC chip that includes the DC 34 and UC 40. Alternatively, the local oscillator 128 and local oscillator 140 may be included in the same RFIC chip that includes the local oscillator interface 144, the PLL circuit 148, and the micro-controller unit 152.

Figure 7:
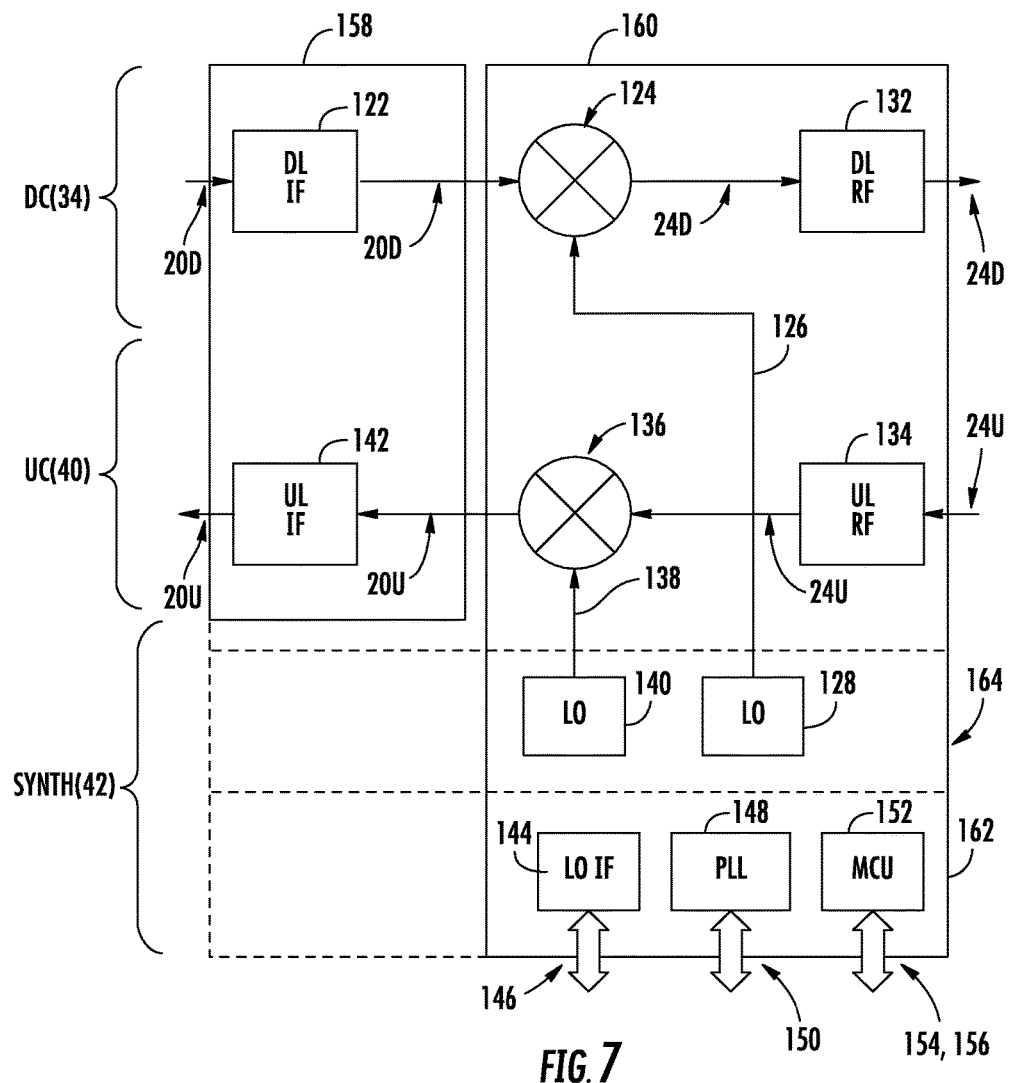
Figure 8:
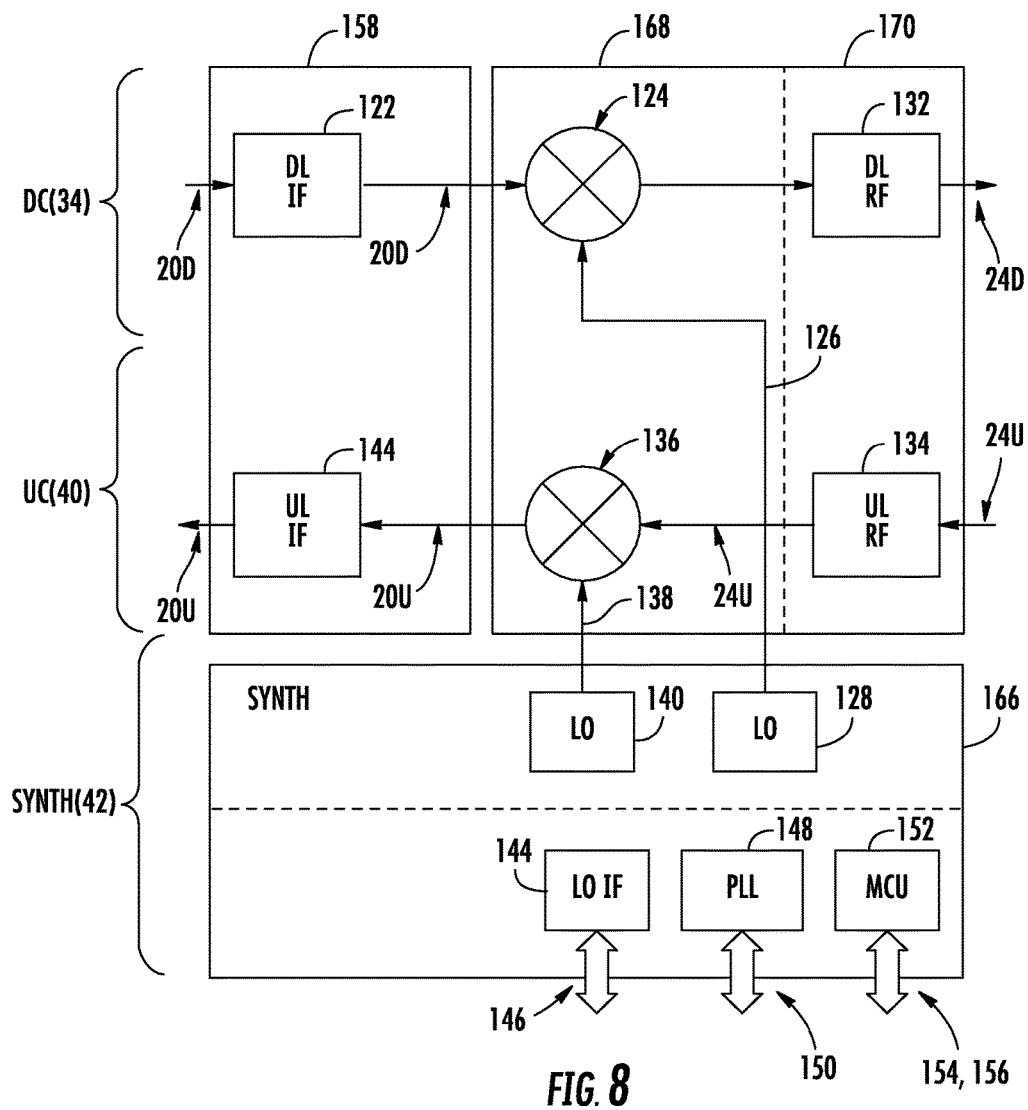

Other architectures of dividing the DL 34, the UC 40, and the synthesizer circuitry 42 components into more than one RFIC chip are also possible. For example, FIG. 7 illustrates these components with alternative configurations of splitting these components between different RFIC chips. For example, the downlink interface 122 and the uplink interface 142 may be provided together in a RFIC chip 158. The other components as illustrated in FIG. 7 may be provided in another RFIC chip 160. Alternatively, the local oscillators 128, 140 could be included in the same RFIC chip as the downconversion and upconversion mixers 124, 136, and the downlink RF circuit 132 and the uplink RF circuit 134. The local oscillator interface 144, the PLL circuit 148, and the micro-controller unit 152 could be provided in a third RFIC chip 162. In yet another configuration, the local oscillators 128, 140 could be included in the same RFIC chip 162 and not in the RFIC chip 160. In yet another configuration, four RFIC chips could be provided. RFIC chip 158 is illustrated in FIG. 7 could be provided the local oscillators 128, 140 could be provided in a fourth RFIC chip 164, wherein the local oscillator interface 144, the PLL circuit 148, and the micro-controller unit 152 are provided in a third RFIC chip 162. The RFIC chip 160 could include the downconversion and upconversion mixers 124, 136, the downlink RF circuit 132, and the uplink RF circuit 134. In yet another configuration, the downlink interface 122, the uplink interface 142, and the local oscillators 128, 140 could be provided in a single RFIC chip. The local oscillator interface 144, the PLL circuit 148, and the micro-controller unit 152 would be included in a second RFIC chip, and the downconversion and upconversion mixers 124, 136, the downlink RF circuit 132 and the uplink RF circuit 134 included in a third RFIC chip. FIG. 8 illustrates additional configurations of providing the components of the DC 34, the UC 40, and the synthesizer circuitry 42 into different RFIC chips. For example, as illustrated in FIG. 8, the downlink interface 122 and uplink interface 142 could be included in the RFIC chip 158. The local oscillators 128, 140, and the local oscillator interface 144, the PLL circuit 148, and the micro-controller unit 152 could be included in a second RFIC chip 166. The downconversion mixer 124 and the upconversion mixer 136 could be included in a third RFIC chip 168. The downlink RF circuit 132 and the uplink RF circuit 134 could be included in the RFIC chip 168 or could be included in their own fourth RFIC chip 170.

Figure 9:
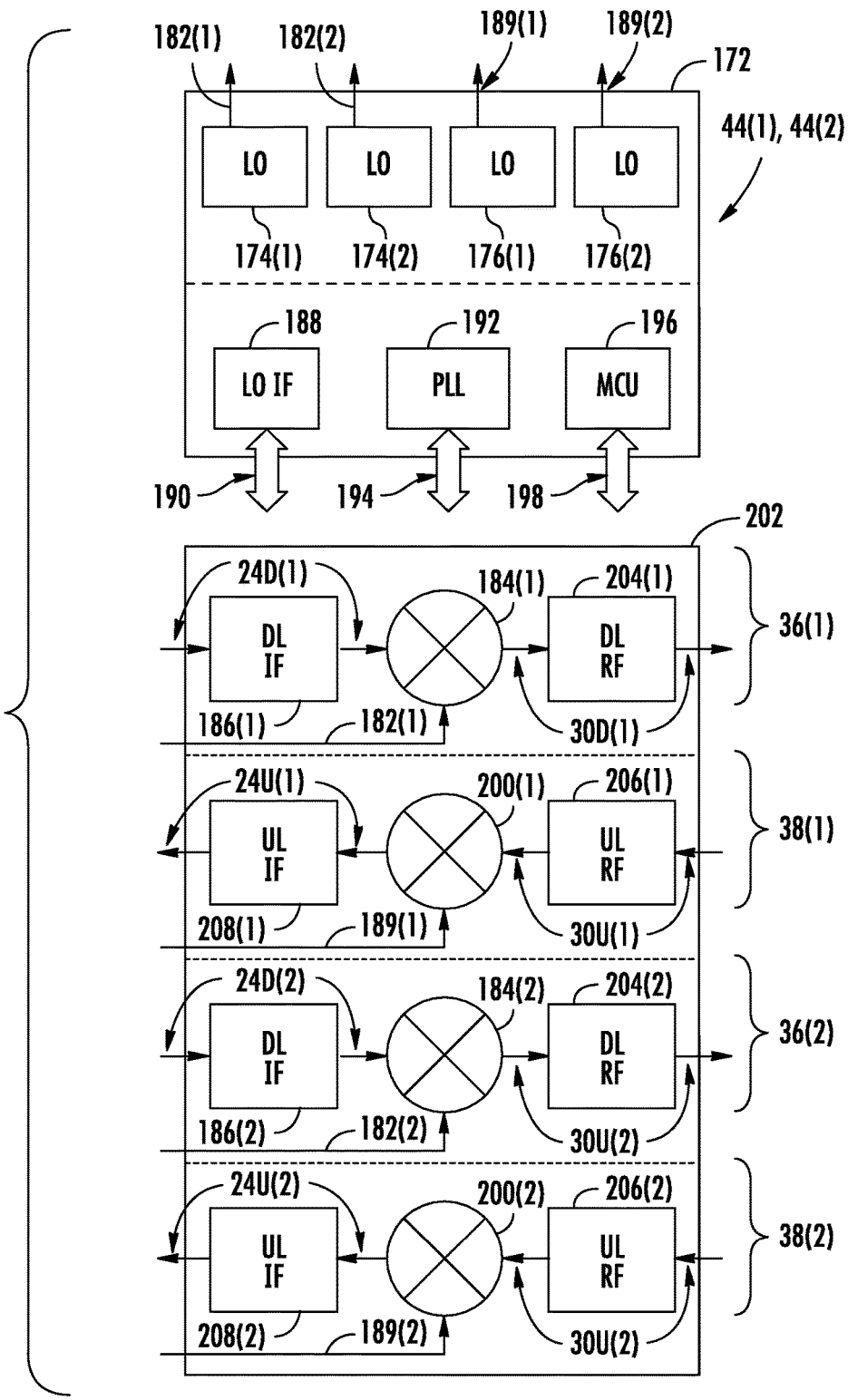
FIGS. 9-14 are schematic diagrams of exemplary RFIC chip architectures that can be provided in a RU supporting RF communications services in a distributed antenna system.

The components provided in the remote units 12 can also be organized in different configurations and provided among one or more RFIC chips. FIG. 9 illustrates one embodiment of UC 36, DC 38, and synthesizer circuitry 44 organized among one or more RFIC chips. In the example of FIG. 9, the synthesizer circuitry 44(1), 44(2) is provided in a single RFIC chip 172. In this embodiment, the synthesizer circuitry 44(1), 44(2) supports two different radio bands for a RU 12. In this regard, the synthesizer circuitry 44(1), 44(2) includes two upconversion local oscillators 174(1), 174(2) and two downconversion local oscillators 176(1), 176(2). The upconversion local oscillators 174(1), 174(2) provide local oscillation signals 182(1), 182(2) to upconversion mixer 186 and upconversion mixer 188, respectively. The upconvert local oscillator signals 182(1), 182(2) are provided to upconversion mixers 184(1), 184(2) to provide a reference signal for frequency upconversion of downlink electrical RF communications signals 24D(1), 24D(2). The downlink electrical RF communications signals 24D(1), 24D(2) are received by a downlink interfaces 186(1), 186(2) for the RU 12 to support two radio bands. The RFIC chip 172 also contains a local oscillator interface 188 configured to receive source signal 190 for providing control signals to the upconversion local oscillators and downconversion local oscillators 174(1)-174(2), 176(1)-176(2). A PLL circuit 192 is also provided that is configured to receive control signal 194 to phase lock loop the local oscillators 174(1)-174(2), 176(1)-176(2) to source signal 190. A microcontrol unit 196 is also provided that is configured to exchange management signals 198 for providing control of the synthesizer circuitry 44(1), 44(2).

With continuing reference to FIG. 9, the downconversion local oscillators 176(1), 176(2) are configured to generate downconversion oscillation signals 189(1), 189(2) to be provided to downconversion mixers 200(1), 200(2), respectively. The UCs 36(1), 36(2) and the DCs 38(1), 38(2) are provided in a second RFIC chip 202. For the UCs 36(1), 36(2), the downlink electrical RF communications signals 24D(1), 24D(2) are mixed by the upconversion mixers 184(1), 184(2) to be upconverted back to RF communications signals at the same frequency as the downlink electrical RF communications signals 20D(1), 20D(2) to provide the downlink RF communications signals 30D(1), 30D(2). The downlink RF communications signals 30D(1), 30D(2) are received by downlink RF circuits. The downlink RF circuits 204(1), 204(2) receive the downlink RF communications signals 30D(1), 30D(2) and provide these signals to the antenna interface 32 (see FIGS. 4 and 5).

With continuing reference to FIG. 9, the DCs 38(1), 38(2) are also provided in the RF communication chip 202 containing the UCs 36(1), 36(2). Uplink RF circuits 206(1), 206(2) are provided to receive the uplink RF communication signals 30U(1), 30U(2) from the antenna interface 32. The uplink RF circuits 206(1), 206(2) provide the uplink RF communications signals 30U(1), 30U(2) to the downconversion mixers 200(1), 200(2) to downconvert the frequency of these signals before being provided to the uplink interfaces 208(1), 208(2).

Figure 10:
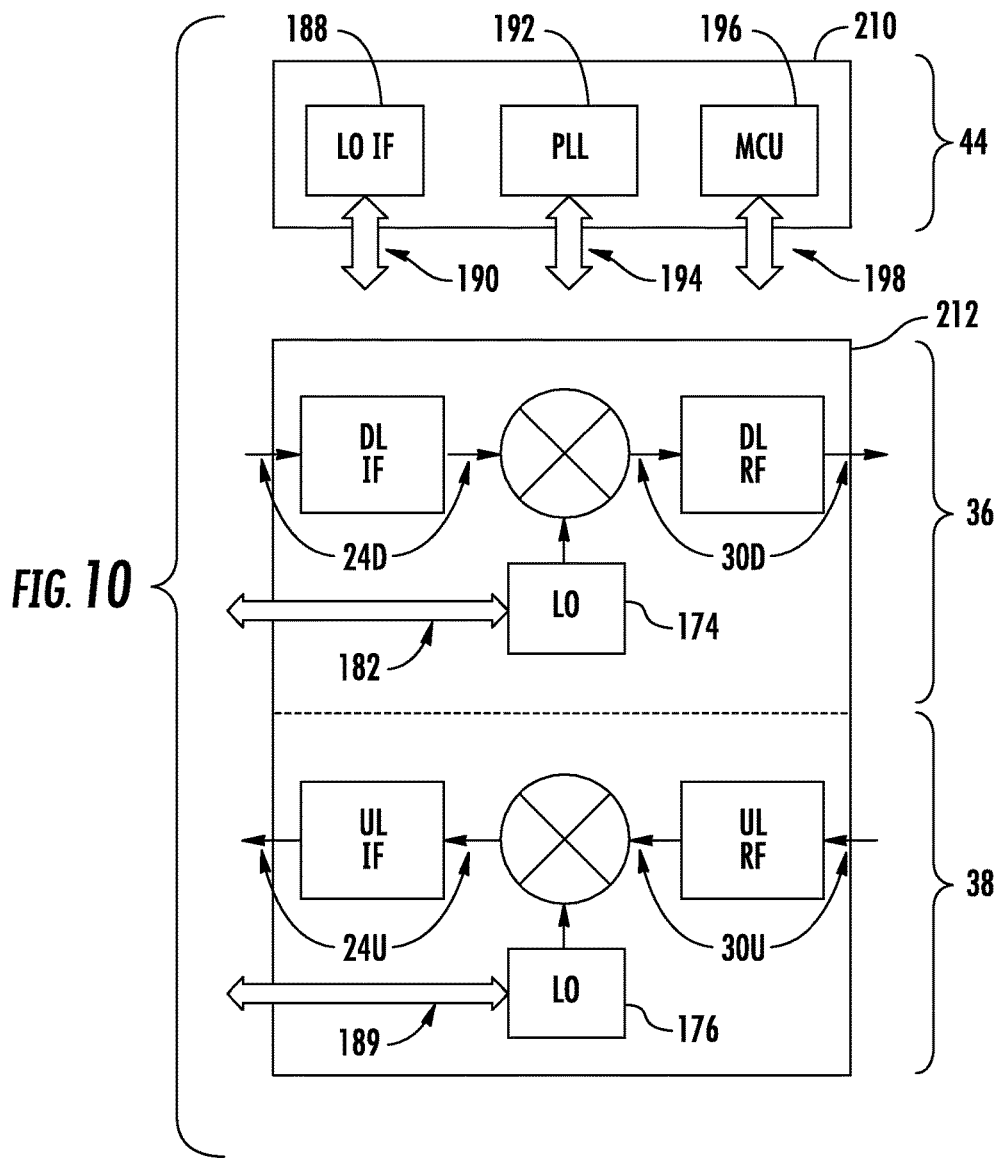

Other configurations and organizations of the UC 36, DC 38, and synthesizer circuitry 44 in the RU 12 can be provided. For example, with reference back to FIG. 9, the local oscillators 174(1), 174(2), 176(1), 176(2) can be provided in a different RFIC chip than the local oscillator interface 188, PLL circuit 192, and micro-controller unit 196. As another example with reference to FIG. 10, a single radio band configuration is shown for the UC 36 and DC 38. Instead of the local oscillators 174, 176 being included in the same RFIC chip 210 as including the local oscillator interface 188, PLL circuit 192, and micro-controller unit 196, the local oscillators 174, 176 are included in a RFIC chip 212 that includes the UC 36 and the DC 38.

Figure 11:
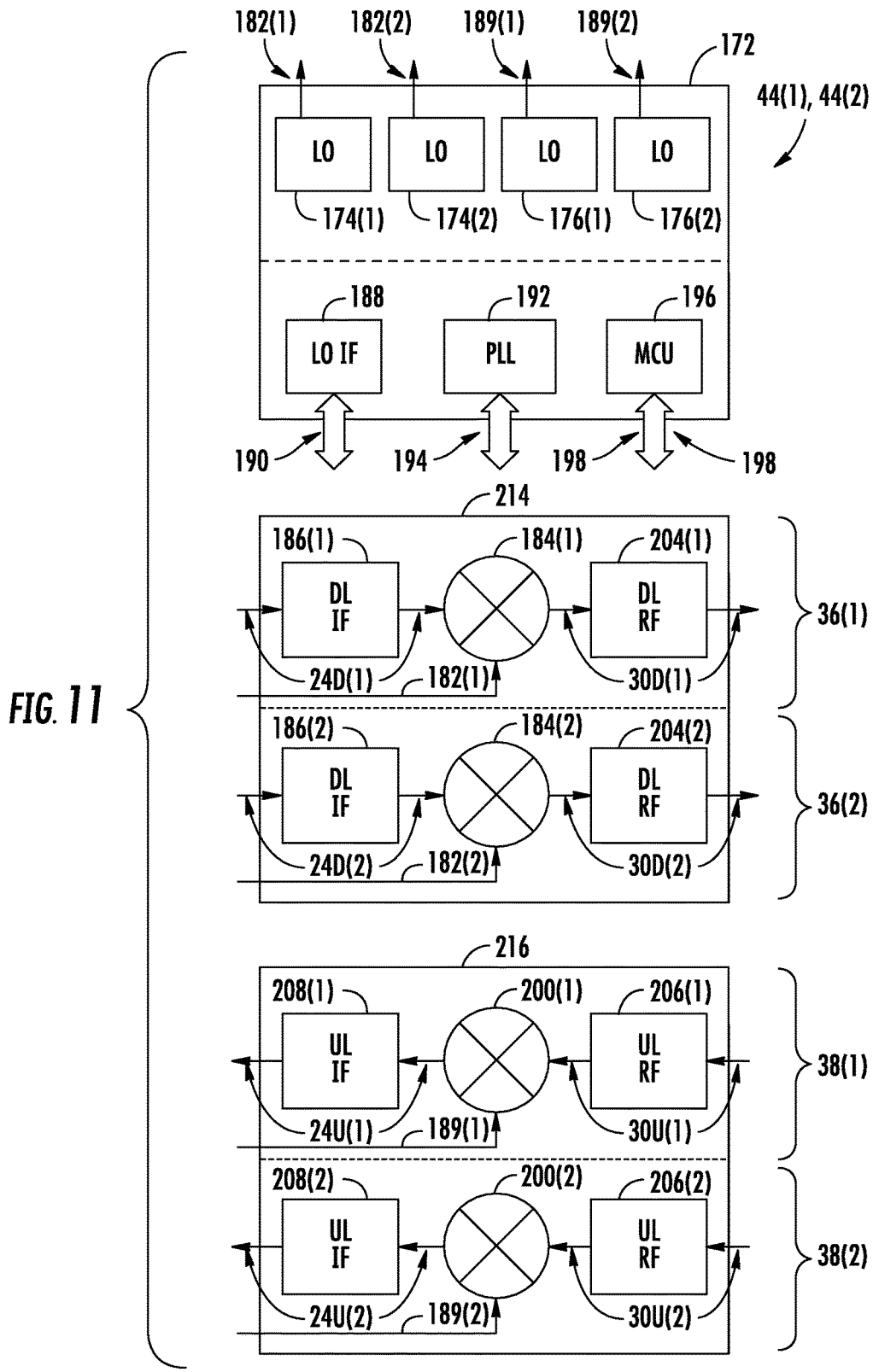

In FIG. 11, an alternative configuration is provided for the UCs 36(1), 36(2) and the DCs 38(1), 38(2). In this embodiment, the UCs 36(1), 36(2) are provided in a separate RFIC chip 214, and the DCs 38(1), 38(2) are provided in a separate RFIC chip 216. The synthesizer circuitry 44(1), 44(2) supporting both radio bands supporting providing both oscillation signals 182(1), 182(2), 189(1), 189(2) are provided in the RFIC chip 172 just as provided in the example of the RU in FIG. 9.

Figure 12:
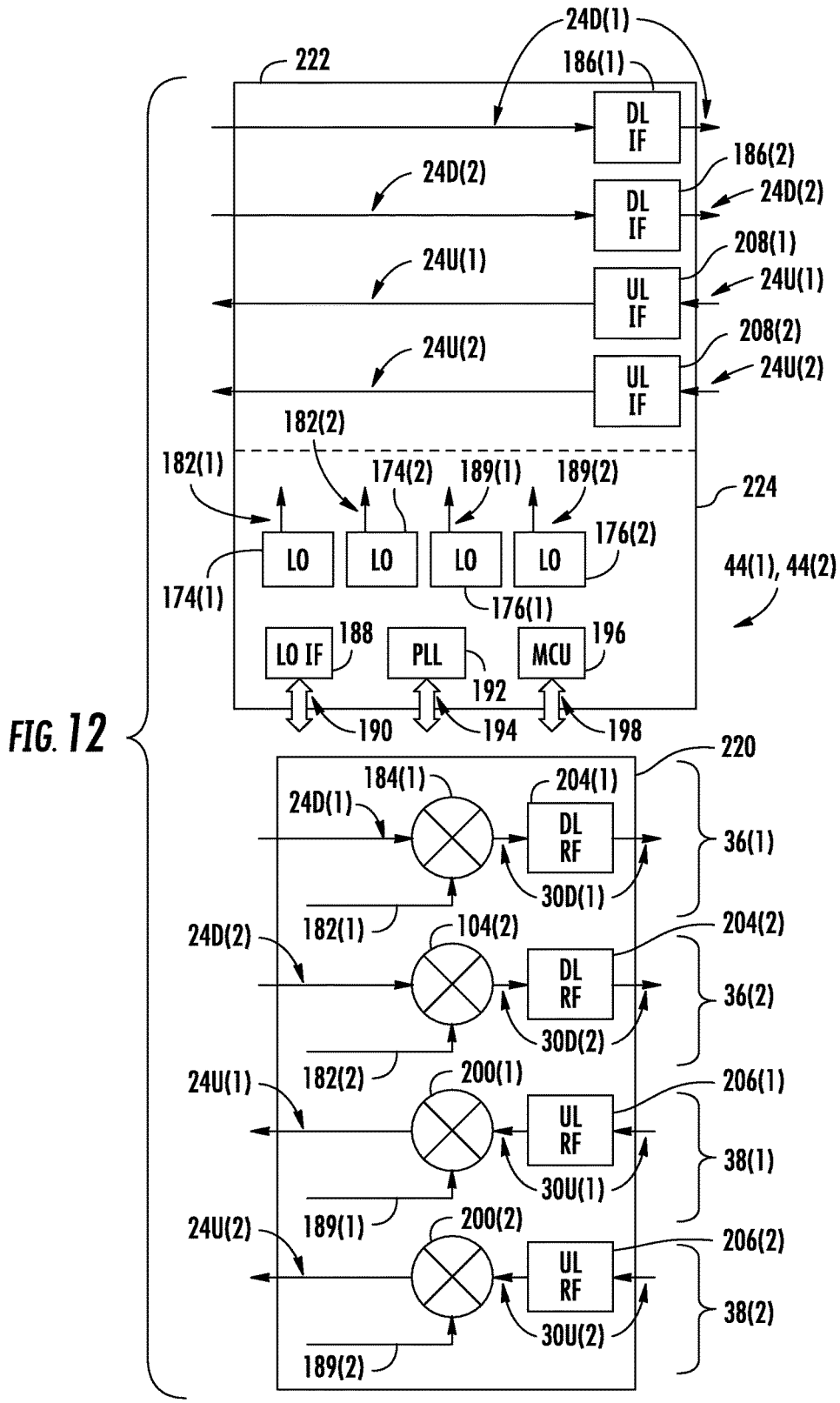

FIG. 12 illustrates yet another variation of organization of the UC 36, DC 38, and synthesizer circuitry 44 among different RFIC chips. In this regard, the UC 36(1), 36(2) and the DC 38(1), 38(2) with the downlink and uplink interfaces 186(1), 186(2), 208(1), 208(2) not included are provided in a first RFIC chip 220. A second RFIC chip 222 contains the synthesizer circuitry 44(1), 44(2) and the downlink and uplink interfaces 186(1), 186(2), 208(1), 208(2). Alternatively, the synthesizer circuitry 44(1), 44(2) could be provided in a third RFIC chip 224 that is separate from the RFIC chip 222, if desired.

Figure 13:
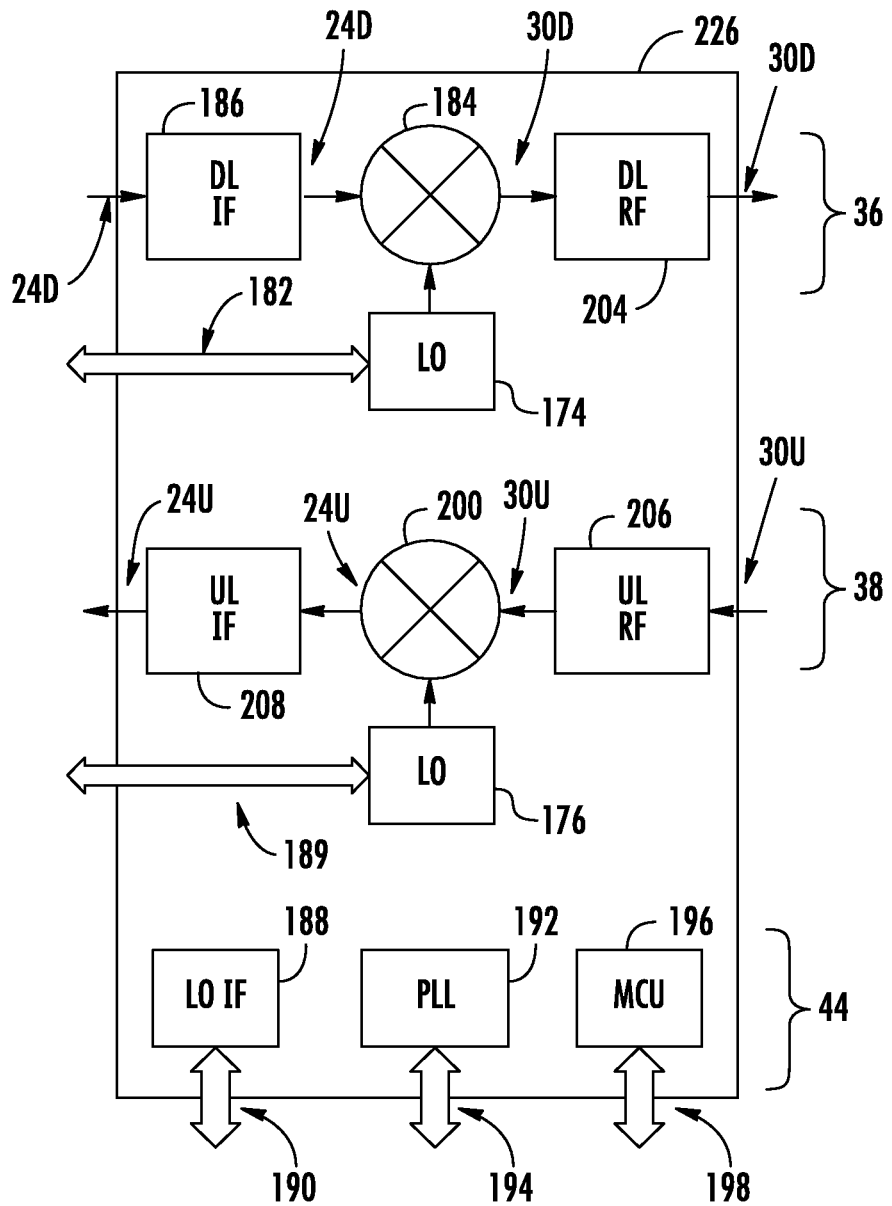
Figure 14:
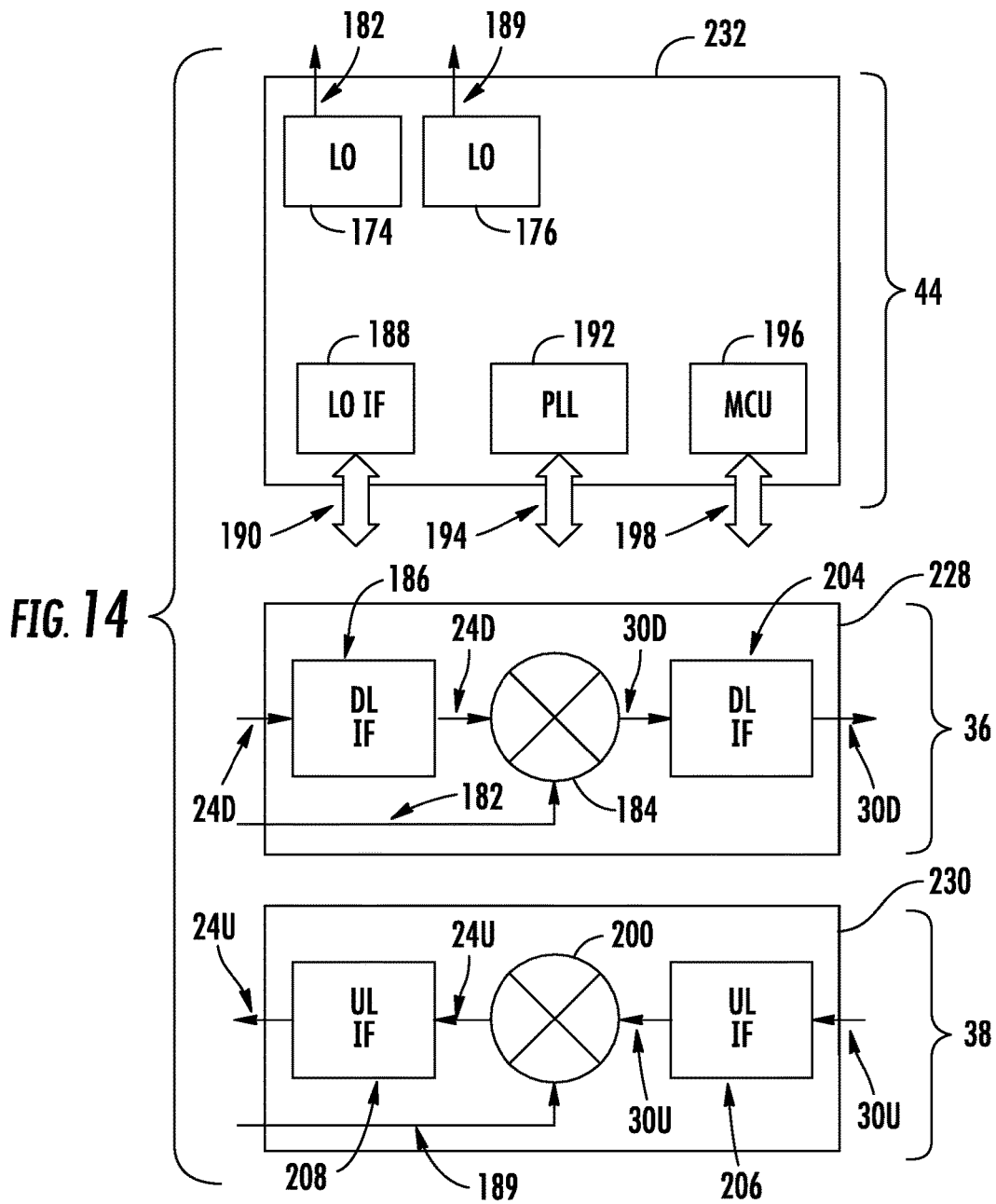

FIG. 13 illustrates yet another alternative embodiment of a RFIC chip configuration for a remote unit (RU) 12, for a single radio band. In this embodiment, the UC 36, the DC 38, and the synthesizer circuitry 44 for a single band are all included in the same RFIC chip 226. In yet another embodiment as illustrated in FIG. 14, the UC 36, the DC 38, and the synthesizer circuitry 44 supporting a single radio band are provided in separate RFIC chips 228, 230, and 232, respectively.

The above examples of distributed antenna systems are not limited to frequency shifting of communications signals or to a particular frequency shifting scheme. The downlink communication signals could be frequency upconverted or downconverted. The uplink signals could be frequency upconverted or downconverted.

Figure 15:
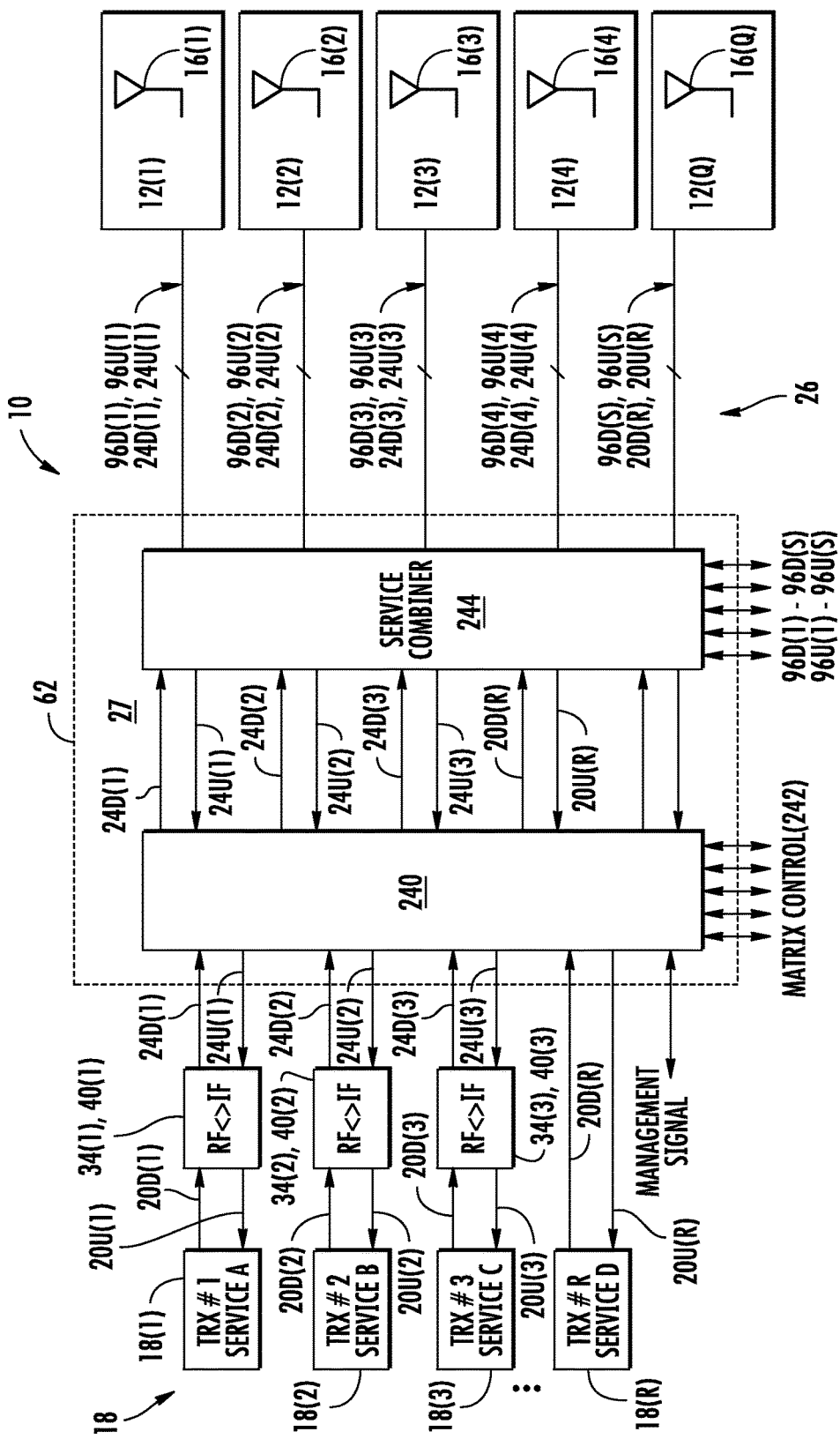
FIG. 15 is a schematic diagram of another exemplary distributed antenna system that includes a distributed WLAN system for providing digital data services and a distributed RF communications system employing a RFIC chip switching matrix for providing switched RF communications services to RUs.

FIG. 15 is a schematic diagram of the exemplary distributed antenna system 10 in FIG. 1, but employing a switching matrix 240 in the communications interface 27 for providing multiple switched RF communications services and/or digital data services to any of a plurality of RUs 12(1)-12(Q), where Q signifies any number of RUs 12. The switching matrix 240 is disposed in the communications interface RFIC chip 62 in this embodiment. The RUs 12(1)-12(Q) may be AP, like the APs 102 in the distributed antenna system 80 in FIG. 2, that are capable of supporting RF communication services and digital data services. With continuing reference to FIG. 15, common element numbers between components in the distributed antenna system 10' in FIG. 4 and the distributed antenna system 10 in FIG. 1 denote common elements and functionality, and thus will not be re-described. The notations (1)-(4) signify common elements, but four of the elements provided, to support four transmissions from the radio interface 18 of up to four RF communications switched to any of the RUs 12(1)-12(R) desired.

The distributed antenna system 10 in FIG. 15 shows RUs 12(1)-12(Q) supporting both RF communications services and digital data services. The switching matrix 240 can be configured through the matrix control signals 242 to provide (i.e., switch) any combination of the RF communication services from the radio interfaces 18(1)-18(R) to the RUs 12(1)-12(Q). As a non-limiting example, one radio interface 18(R) provides RF communication services over downlink RF communications signals 20D(R) that are not frequency shifted. A service combiner 244 is provided to combine any of the RF communications services switched by the switching matrix 240 (i.e., downlink RF communications signals 24D(1)-24D(3) and 20D(R)) with downlink digital data signals 96D(1)-96D(S) to be provided over the communications medium 26 to the RUs 12(1)-12(Q) according to the configured switching in the switching matrix. In this manner, the matrix control signals 242 can control which RUs 12(1)-12(Q) receive which RF communications services from the radio interfaces 18(1)-18(R).

Figure 16:
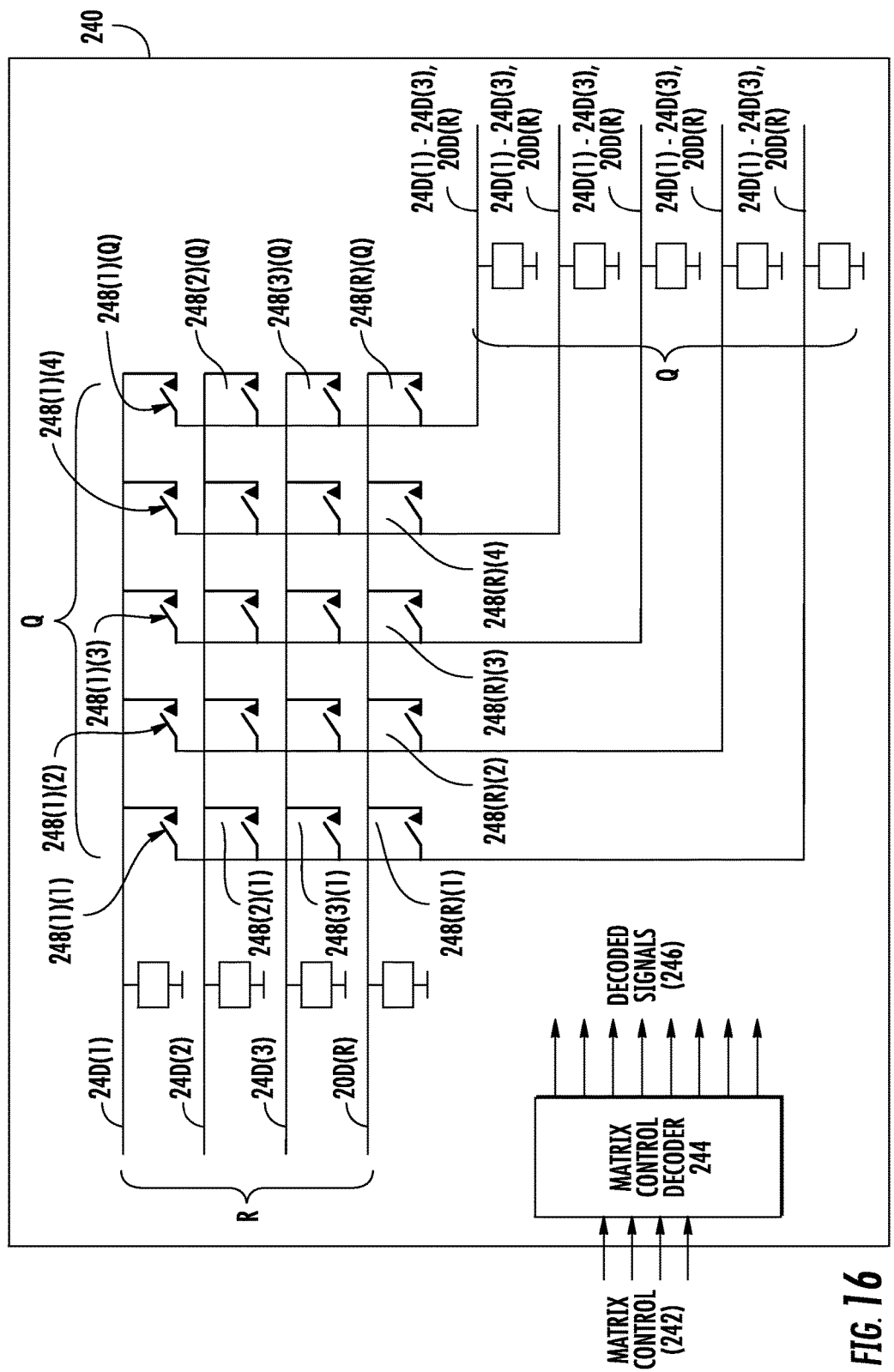
FIG. 16 is a schematic diagram of an intermediate frequency (IF) switching matrix employing a RFIC chip for providing switched RF communications services to RUs, and that may be provided as the switching matrix in the system in FIG. 15.

FIG. 16 is a schematic diagram of the switching matrix 120 illustrating more detail regarding the switching provided therein. FIG. 16 only illustrates the switching circuitry in the switching matrix 240 for downlink RF communications services, but the same principles can apply for uplink RF communications services as well. As previously discussed, the switching matrix can be employed in communications interface RFIC chip 62 (FIG. 15) for switching RF communications services to the RUs 12(1)-12(Q). As illustrated in FIG. 16, the switching matrix 240 includes a matrix control decoder 244 that receives the matrix control signals 242 to provide decoded switching signals 246. The decoded switching signals 246 control the matrix of switches 248. The matrix of switches is designed to switch any combination of the downlink RF communications signals 24D(1)-24D(3), 20D(R) to any RU 12(1)-12(Q). In this example, the switching matrix 240 is two-dimensional matrix of R×Q size, where R is the number of downlink RF communication services, and Q is the number of RUs 12.

Figure 17:
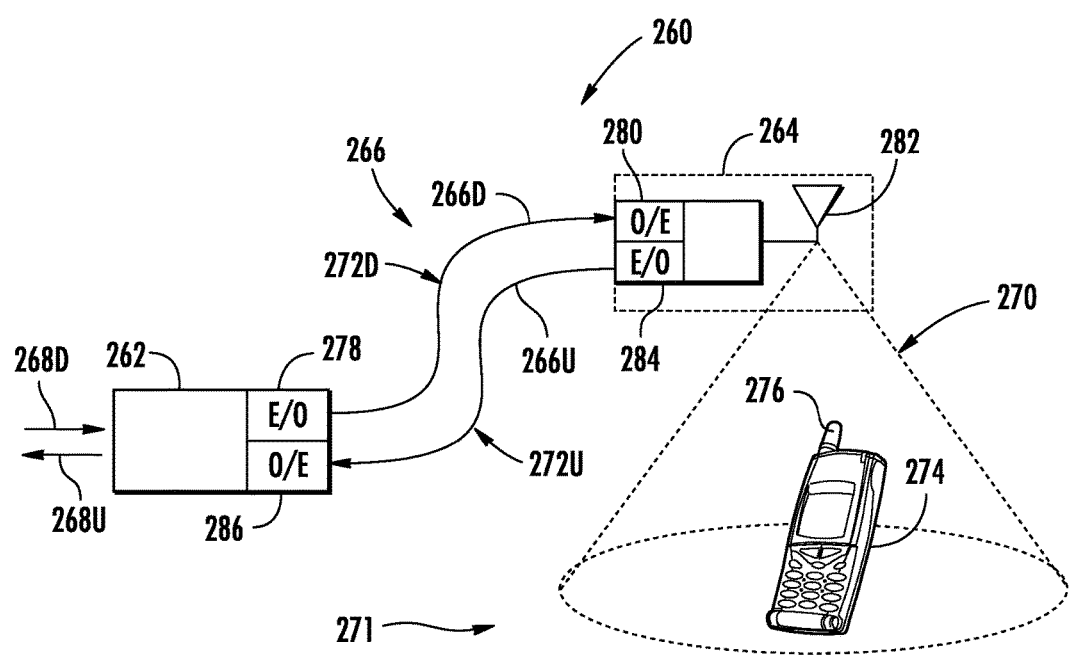
FIG. 17 is a schematic diagram of an exemplary optical fiber-based distributed antenna system that can include RFIC chips to provide RF communications services.

The distributed antenna systems that can employ the RFIC chip(s) disclosed herein can employ other communications mediums other than electrical conductors. For example, the communications mediums could also include wireless transmission and reception and/or optical fiber. FIG. 17 is a schematic diagram of an embodiment of another distributed antenna system that may employ an RFIC chip(s). In this embodiment, the distributed antenna system is an optical fiber-based distributed antenna system 260. The optical fiber-based distributed antenna system 260 is configured to create one or more antenna coverage areas for establishing communications with wireless client devices located in the RF range of the antenna coverage areas. The system 260 provides RF communication services (e.g., cellular services). In this embodiment, the optical fiber-based distributed antenna system 260 includes central unit 262, one or more RUs 264, and an optical fiber 266 that optically couples the central unit 262 to the RU 264. Also by employing the switching matrix 240, it may be possible to identify which RU 264 is communicating with or closest to a subscriber. For example, see U.S. PCT Application No. US11/29895 filed on Mar. 25,2011 and entitled "Localization Services in Optical Fiber-Based Distributed Communication Components and Systems, and Related Methods," and U.S. PCT Application No. US11/49122 filed on Aug. 25, 2011 entitled "Localization of Wireless Handheld Devices in Distributed Antenna Systems by Signal Delay," both of which are incorporated by reference.

The RU 264 is a type of remote communications unit. In general, a remote communications unit can support either wireless communications, wired communications, or both. The RU 264 can support wireless communications and may also support wired communications. The central unit 262 is configured to receive communications over downlink electrical RF signals 268D from a source or sources, such as a network or carrier as examples, and provide such communications to the RU 264. The central unit 262 is also configured to return communications received from the RU 264, via uplink electrical RF signals 268U, back to the source(s). In this regard in this embodiment, the optical fiber 266 includes at least one downlink optical fiber 266D to carry signals communicated from the central unit 262 to the RU 264 and at least one uplink optical fiber 266U to carry signals communicated from the RU 264 back to the central unit 262. The downlink optical fiber 266D and uplink optical fiber 266U could be provided as the same fiber employing wave division multiplexing (WDM) as an example.

One downlink optical fiber 266D and one uplink optical fiber 266U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the optical fiber-based distributed antenna system 260 either in conjunction with RF communications signals or not.

The optical fiber-based distributed antenna system 260 has an antenna coverage area 270 that can be disposed about the RU 264. The antenna coverage area 270 of the RU 264 forms an RF coverage area 271. The central unit 262 is adapted to perform or to facilitate any one of a number of Radio-over-Fiber (RoF) applications, such as RF identification (RFID), wireless local-area network (WLAN) communication, or cellular phone service. Shown within the antenna coverage area 270 is a wireless client device 274 in the form of a mobile device as an example, which may be a cellular telephone as an example. The wireless client device 274 can be any device that is capable of receiving RF communications signals. The wireless client device 274 includes an antenna 276 (e.g., a wireless card) adapted to receive and/or send electromagnetic RF signals. As previously discussed above, it may be typical for the antenna 276 of the wireless client device 274 to be oriented perpendicular or substantially perpendicular to the ground during use such that the antenna 276 has a vertical polarization to the ground.

With continuing reference to FIG. 17, to communicate the electrical RF signals over the downlink optical fiber 266D to the RU 264, to in turn be communicated to the wireless client device 274 in the antenna coverage area 270 formed by the RU 264, the central unit 262 includes a radio interface in the form of an electrical-to-optical (E/O) converter 278. The E/O converter 278 converts the downlink electrical RF signals 268D to downlink optical RF signals 272D to be communicated over the downlink optical fiber 266D. The RU 264 includes an optical-to-electrical (O/E) converter 280 to convert received downlink optical RF signals 272D back to electrical RF signals to be communicated wirelessly through a selected antenna 282 of the RU 264 to wireless client devices 274 located in the antenna coverage area 270. The selected antenna 282 used in communication to the wireless client device 274 may be selected according to an automatic antenna selection arrangement, including the distributed antenna system 10 disclosed herein that is included in the RU 264.

Similarly, the selected antenna 282 is also configured to receive wireless RF communications from wireless client devices 274 in the antenna coverage area 270. In this regard, the selected antenna 282 receives wireless RF communications from wireless client devices 274 and communicates electrical RF signals representing the wireless RF communications to an E/O converter 284 in the RU 264. The E/O converter 284 converts the electrical RF signals into uplink optical RF signals 272U to be communicated over the uplink optical fiber 266U. An O/E converter 286 provided in the central unit 262 converts the uplink optical RF signals 272U into uplink electrical RF signals, which can then be communicated as uplink electrical RF signals 268U back to a network or other source. The central unit 262 in this embodiment is not able to distinguish the location of the wireless client devices 274 in this embodiment. The wireless client device 274 could be in the range of any antenna coverage area 270 formed by an RU 264.

In a typical cellular system, for example, a plurality of BTSs are deployed at a plurality of remote locations to provide wireless telephone coverage. Each BTS serves a corresponding cell and when a mobile wireless client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples.

The optical fiber-based distributed antenna system 260 in FIG. 17 may be configured to support distribution of both radio-frequency (RF) communication services and digital data services. The RF communication services and digital data services may be provided over optical fiber to wireless client devices 274 through the RUs 264. For example, non-limiting examples of digital data services include WLAN, WiMax, WiFi, Digital Subscriber Line (DSL), and LTE, etc. Digital data services can also be provided over optical fiber separate from optical fiber 266D, 266U providing RF communication services. Alternatively, digital data services can be provided over common optical fiber 266D, 266U with RF communication services. For example, digital data services can be provided over common optical fiber 266D, 266U with RF communication services at different wavelengths through WDM and/or at different frequencies through FDM. Power provided in the distributed antenna system to provide power to remote units can also be accessed to provide power to digital data service components.

Figure 18:
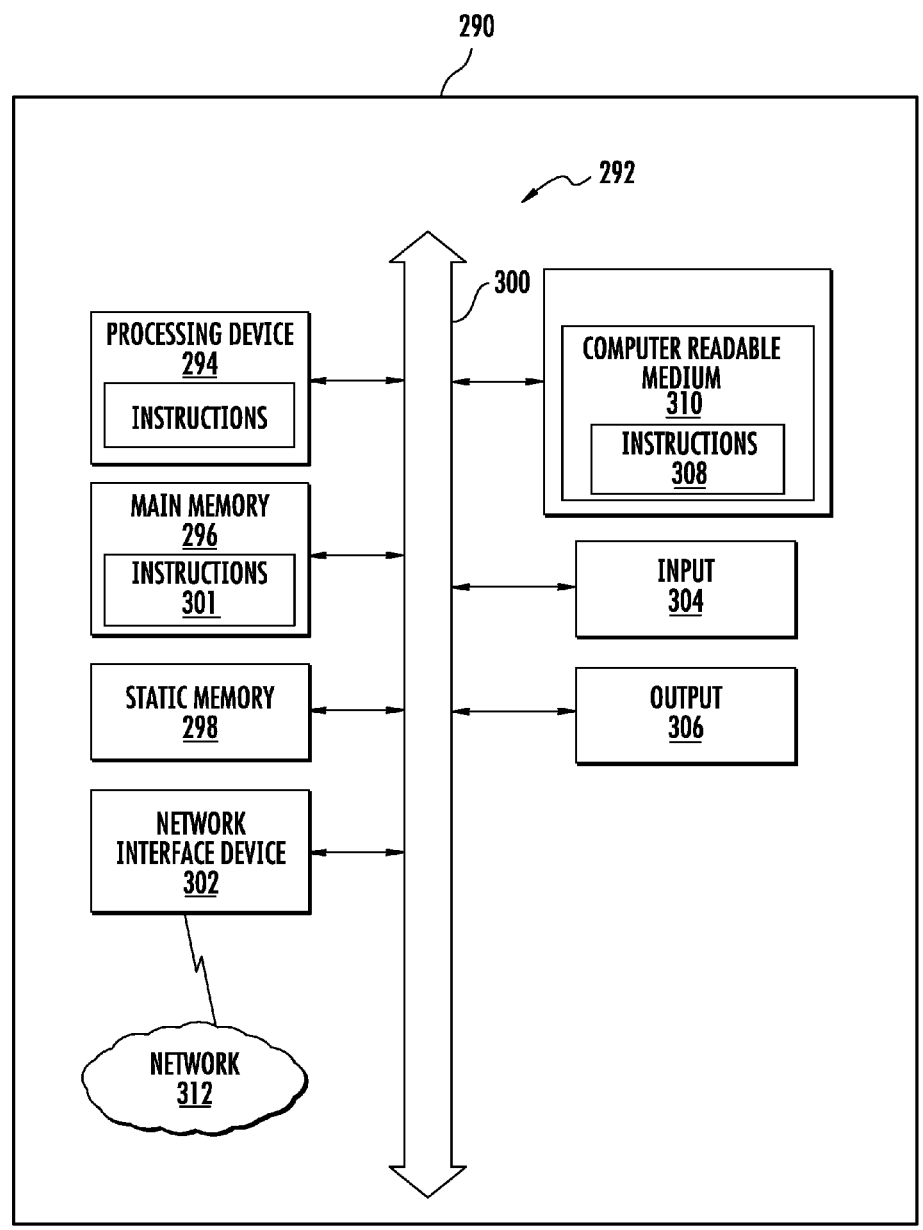
FIG. 18 is a schematic diagram of a generalized representation of a computer system that can be included in or interface with any of the RFIC chips described herein.

Any of the distributed antenna system components disclosed herein can include a computer system. In this regard, FIG. 18 is a schematic diagram representation of additional detail regarding an exemplary form of an exemplary computer system 290 that is adapted to execute instructions from an exemplary computer-readable medium to perform power management functions and can be included in a distributed antenna system component(s). In this regard, the computer system 290 includes a set of instructions for causing the distributed antenna system component(s) to provided its designed functionality. The distributed antenna system component(s) may be connected (e.g., networked) to other machines in a LAN, an intranet, an extranet, or the Internet. The distributed antenna system component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The distributed antenna system component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 290 in this embodiment includes a processing device or processor 294, a main memory 296 (e.g., read-only memory (ROM), flash memory, dynamic random access memory (DRAM) such as synchronous DRAM (SDRAM), etc.), and a static memory 298 (e.g., flash memory, static random access memory (SRAM), etc.), which may communicate with each other via the data bus 300. Alternatively, the processing device 294 may be connected to the main memory 296 and/or static memory 298 directly or via some other connectivity means. The processing device 294 may be a controller, and the main memory 296 or static memory 298 may be any type of memory, each of which can be included in the central unit 262.

The processing device 294 represents one or more general-purpose processing devices such as a microprocessor, central processing unit, or the like. More particularly, the processing device 294 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 294 is configured to execute processing logic in instructions 301 for performing the operations and steps discussed herein.

The computer system 290 may further include a network interface device 302. The computer system 290 also may or may not include an input 304 to receive input and selections to be communicated to the computer system 290 when executing instructions. The computer system 290 also may or may not include an output 306, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 290 may or may not include a data storage device that includes instructions 308 stored in a computer-readable medium 310. The instructions 308 may also reside, completely or at least partially, within the main memory 296 and/or within the processing device 294 during execution thereof by the computer system 290, the main memory 296 and the processing device 294 also constituting computer-readable medium. The instructions 301 may further be transmitted or received over a network 312 via the network interface device 302.

While the computer-readable medium 310 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals.

Many modifications and other embodiments of the embodiments set forth herein will come to mind to one skilled in the art to which the embodiments pertain having the benefit of the teachings presented in the foregoing descriptions and the associated drawings. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A central unit for providing communications signals in a distributed antenna system, comprising:
   a radio-frequency (RF) communications interface configured to:
      receive downlink RF communication signals at a RF communications frequency for a RF communications service; and
      provide uplink RF communication signals at the RF communications frequency for the RF communications service;
   at least one RF integrated circuit (IC) (RFIC) chip comprising at least one of:
      a first frequency conversion circuitry configured to shift a frequency of the downlink RF communication signals to an intermediate frequency (IF) having a different frequency than the RF communications frequency, to provide downlink IF communications signals; and
      a second frequency conversion circuitry configured to shift the frequency of uplink IF communication signals to the RF communications frequency to provide the uplink RF communications signals; and
   a communications interface comprising RF communications circuitry configured to:
      provide the downlink IF communications signals over a communications medium to one or more remote units (RUs); and
      receive the uplink IF communication signals provided over a communications medium from the one or more RUs and provide the uplink IF communication signals to the second frequency conversion circuitry.

2. The central unit of claim 1, wherein the communications interface is included in the at least one RFIC chip.

3. The central unit of claim 2, wherein the communications interface further comprises a switching matrix configured to switch received downlink IF communications signals to selected RUs among the one or more RUs.

4. The central unit of claim 3, wherein:
   the first frequency conversion circuitry is further configured to receive at least one first local oscillator (LO) signal to shift the frequency of the downlink RF communication signals to the IF to provide the downlink RF communication signals, and the second frequency conversion circuitry is further configured to receive at least one second LO signal to shift the frequency of the uplink IF communication signals to the RF communications frequency to provide the uplink RF communication signals.

5. The central unit of claim 3, wherein the first frequency conversion circuitry is comprised of an up conversion frequency conversion circuitry, the second frequency conversion circuitry is comprised of a down conversion frequency conversion circuitry.

6. The central unit of claim 2, further comprising synthesizer circuitry configured to generate at least one first frequency conversion reference signal provided to the first frequency conversion circuitry and generate at least one second frequency conversion reference signal provided to the second frequency conversion circuitry.

7. The central unit of claim 6, wherein the synthesizer circuitry is provided in the at least one RFIC chip, and wherein the at least one RFIC chip comprises a synthesizer RFIC chip comprising the synthesizer circuitry.

8. The central unit of claim 6, wherein the first frequency conversion circuitry is comprised of a down conversion frequency conversion circuitry, the second frequency conversion circuitry is comprised of an up conversion frequency conversion circuitry.

9. The central unit of claim 1, further comprising:
a second communications interface configured to:
receive second downlink RF communication signals at a second RF communications frequency for a second RF communications service; and
receive second uplink RF communication signals at the second RF communications frequency for the second RF communications service;
at least one second RFIC chip comprising at least one of:
a third frequency conversion circuitry configured to shift the frequency of the second downlink RF communication signals to a second intermediate frequency (IF) having a different frequency than the second RF communications frequency, to provide second downlink IF communications signals; and
a fourth frequency conversion circuitry configured to shift the frequency of second uplink IF communication signals to the second RF communications frequency to provide the second uplink RF communications signals.

10. The central unit of claim 9, further comprising a communications interface comprising communications circuitry configured to:
receive the downlink IF communications signals and provide the downlink IF communications signals to one or more remote units (RUs);
receive the second downlink IF communications signals and provide the second downlink IF communications signals to the one or more RUs;
receive the uplink IF communication signals from the one or more RUs and provide the uplink IF communication signals to the at least one RFIC chip; and
receive the second uplink IF communication signals from the one or more RUs and provide the second uplink IF communication signals to the at least one RFIC chip.

11. A central unit for providing communications signals in a distributed antenna system, comprising:
a radio-frequency (RF) communications interface configured to:
receive downlink RF communication signals at a RF communications frequency for a RF communications service; and
provide uplink RF communication signals at the RF communications frequency for the RF communications service;
at least one RF integrated circuit (IC) (RFIC) chip comprising at least one of:
a first frequency conversion circuitry configured to shift a frequency of the downlink RF communication signals to an intermediate frequency (IF) having a different frequency than the RF communications frequency, to provide downlink IF communications signals; and
a second frequency conversion circuitry configured to shift the frequency of uplink IF communication signals to the RF communications frequency to provide the uplink RF communications signals;
a second communications interface configured to:
receive second downlink RF communication signals at a second RF communications frequency for a second RF communications service; and
receive second uplink RF communication signals at the second RF communications frequency for the second RF communications service; and
at least one second RFIC chip comprising at least one of:
a third frequency conversion circuitry configured to shift the frequency of the second downlink RF communication signals to a second intermediate frequency (IF) having a different frequency than the second RF communications frequency, to provide second downlink IF communications signals; and
a fourth frequency conversion circuitry configured to shift the frequency of second uplink IF communication signals to the second RF communications frequency to provide the second uplink RF communications signals.

12. The central unit of claim 11, further comprising a communications interface comprising RF communications circuitry configured to:
provide the downlink IF communications signals over a communications medium to one or more remote units (RUs); and
receive the uplink IF communication signals provided over a communications medium from the one or more RUs and provide the uplink IF communication signals to the second frequency conversion circuitry.

13. The central unit of claim 12, further comprising synthesizer circuitry configured to generate at least one first frequency conversion reference signal provided to the first frequency conversion circuitry and generate at least one second frequency conversion reference signal provided to the second frequency conversion circuitry.

14. The central unit of claim 12, wherein:
the first frequency conversion circuitry is further configured to receive at least one first local oscillator (LO) signal to shift the frequency of the downlink RF communication signals to the IF to provide the downlink RF communication signals, and
the second frequency conversion circuitry is further configured to receive at least one second LO signal to shift the frequency of the uplink IF communication signals to the RF communications frequency to provide the uplink RF communication signals.

15. The central unit of claim 12, further comprising a communications interface comprising communications circuitry configured to:
receive the downlink IF communications signals and provide the downlink IF communications signals to one or more remote units (RUs);

receive the second downlink IF communications signals and provide the second downlink IF communications signals to the one or more RUs;

receive the uplink IF communication signals from the one or more RUs and provide the uplink IF communication signals to the at least one RFIC chip; and receive the second uplink IF communication signals from the one or more RUs and provide the second uplink IF communication signals to the at least one RFIC chip.

\* \* \* \* \*